(12) United States Patent
d'Armancourt et al.

(10) Patent No.: US 10,628,723 B2
(45) Date of Patent: Apr. 21, 2020

(54) METHODS, SYSTEMS, AND APPARATUSES FOR ENCODING A RADIO FREQUENCY IDENTIFICATION (RFID) INLAY

(71) Applicant: Datamax-O'Neil Corporation, Altamonte Springs, FL (US)

(72) Inventors: Sebastien d'Armancourt, Singapore (SG); Hong Sheng Leong, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/031,175

(22) Filed: Jul. 10, 2018

(65) Prior Publication Data

US 2020/0019830 A1     Jan. 16, 2020

(51) Int. Cl.
    G06K 19/07     (2006.01)
(52) U.S. Cl.
    CPC ................. G06K 19/0723 (2013.01)
(58) Field of Classification Search
    CPC ............. G06K 7/00; G06K 7/08; G06K 7/081
    USPC .................. 235/451, 439, 435, 375
    See application file for complete search history.

(56) References Cited

U.S. PATENT DOCUMENTS

| | | | |
|---|---|---|---|
| 4,786,907 A | 11/1988 | Koelle | |
| 5,030,807 A | 7/1991 | Landt et al. | |
| 5,280,159 A | 1/1994 | Schultz et al. | |
| 5,484,170 A | 1/1996 | Hatfield, Jr. | |
| 5,521,601 A | 5/1996 | Kandlur et al. | |
| 5,528,222 A | 6/1996 | Moskowitz et al. | |
| 5,548,291 A | 8/1996 | Meier et al. | |
| 5,550,547 A | 8/1996 | Chan et al. | |
| 5,554,974 A | 9/1996 | Brady et al. | |
| 5,563,583 A | 10/1996 | Brady et al. | |
| 5,606,323 A | 2/1997 | Heinrich et al. | |
| 5,673,037 A | 9/1997 | Cesar et al. | |
| 5,682,143 A | 10/1997 | Brady et al. | |
| 5,739,791 A | 4/1998 | Barefield et al. | |
| 5,763,867 A | 6/1998 | Main et al. | |

(Continued)

FOREIGN PATENT DOCUMENTS

EP     2083378 A3     7/2009

OTHER PUBLICATIONS

Extended European Search Report for Application No. 19185079.1, dated Nov. 22, 2019, 6 pages.

Primary Examiner — Edwyn Labaze
(74) Attorney, Agent, or Firm — Alston & Bird LLP

(57) ABSTRACT

A method for encoding a Radio Frequency Identification (RFID) inlay is described. The method includes causing, by a processor, a media to travel along a media path in an RFID printer. The media includes a plurality of labels. Each label of the plurality of labels comprises an RFID inlay. The method also includes determining a real-time position of a first label while the media travels along the media path based on an input signal received from a media sensor. The first label includes a first corresponding RFID inlay. Further, the method includes causing an RFID control system to initiate encoding of the first corresponding RFID inlay, and to rotate and continue encoding of the first corresponding RFID inlay until the first corresponding RFID inlay is successfully encoded. The RFID coupler is rotated based on the real-time position of the first label.

18 Claims, 16 Drawing Sheets

(56) References Cited

U.S. PATENT DOCUMENTS

| | | |
|---|---|---|
| 5,777,561 A | 7/1998 | Chieu et al. |
| 5,786,626 A | 7/1998 | Brady et al. |
| 5,793,324 A | 8/1998 | Aslanidis et al. |
| 5,826,328 A | 10/1998 | Brady et al. |
| 5,850,181 A | 12/1998 | Heinrich et al. |
| 5,850,187 A | 12/1998 | Carrender et al. |
| 5,874,902 A | 2/1999 | Heinrich et al. |
| 5,912,632 A | 6/1999 | Dieska et al. |
| 5,966,082 A | 10/1999 | Cofino et al. |
| 6,107,917 A | 8/2000 | Carrender et al. |
| 6,114,962 A | 9/2000 | Wiklof et al. |
| 6,118,379 A | 9/2000 | Kodukula et al. |
| 6,121,880 A | 9/2000 | Scott et al. |
| 6,140,146 A | 10/2000 | Brady et al. |
| 6,147,604 A | 11/2000 | Wiklof et al. |
| 6,147,606 A | 11/2000 | Duan |
| 6,172,596 B1 | 1/2001 | Cesar et al. |
| 6,213,400 B1 | 4/2001 | Zigler et al. |
| 6,229,408 B1 | 5/2001 | Jovanovich et al. |
| 6,232,870 B1 | 5/2001 | Garber et al. |
| 6,243,013 B1 | 6/2001 | Duan et al. |
| 6,246,326 B1 | 6/2001 | Wiklof et al. |
| 6,259,408 B1 | 7/2001 | Brady et al. |
| 6,278,413 B1 | 8/2001 | Hugh et al. |
| 6,280,544 B1 | 8/2001 | Fox et al. |
| 6,286,762 B1 | 9/2001 | Reynolds et al. |
| 6,286,763 B1 | 9/2001 | Reynolds et al. |
| 6,288,629 B1 | 9/2001 | Cofino et al. |
| 6,294,997 B1 | 9/2001 | Paratore et al. |
| 6,294,998 B1 | 9/2001 | Adams et al. |
| 6,307,517 B1 | 10/2001 | Lee |
| 6,318,636 B1 | 11/2001 | Reynolds et al. |
| 6,369,711 B1 | 4/2002 | Adams et al. |
| 6,369,766 B1 | 4/2002 | Strickland et al. |
| 6,377,176 B1 | 4/2002 | Lee |
| 6,424,262 B2 | 7/2002 | Garber et al. |
| 6,448,886 B2 | 9/2002 | Garber et al. |
| 6,486,769 B1 | 11/2002 | McLean |
| 6,486,780 B1 | 11/2002 | Garber et al. |
| 6,515,919 B1 | 2/2003 | Lee |
| 6,518,885 B1 | 2/2003 | Brady et al. |
| 6,600,418 B2 | 7/2003 | Francis et al. |
| 6,608,551 B1 | 8/2003 | Anderson et al. |
| 6,610,379 B1 | 8/2003 | Adams et al. |
| 6,669,089 B2 | 12/2003 | Cybulski et al. |
| 6,674,359 B1 | 1/2004 | Aslanidis et al. |
| 6,686,830 B1 | 2/2004 | Schirtzer |
| 6,768,419 B2 | 7/2004 | Garber et al. |
| 6,784,789 B2 | 8/2004 | Eroglu et al. |
| 6,812,841 B2 | 11/2004 | Heinrich et al. |
| 6,838,989 B1 | 1/2005 | Mays et al. |
| 6,944,424 B2 | 9/2005 | Heinrich et al. |
| 6,975,228 B2 | 12/2005 | Wrasman et al. |
| 7,245,227 B2 | 7/2007 | Winter et al. |
| 7,274,297 B2 | 9/2007 | Kodukula et al. |
| 7,298,268 B2 | 11/2007 | Zimmerman et al. |
| 7,301,462 B1 | 11/2007 | Holling et al. |
| 7,323,977 B2 | 1/2008 | Kodukula et al. |
| 7,338,914 B2 | 3/2008 | Conwell et al. |
| 7,416,121 B2 | 8/2008 | Zimmerman |
| 7,482,926 B2 | 1/2009 | Pillai |
| 7,501,932 B2 | 3/2009 | Pillai et al. |
| 7,579,955 B2 | 8/2009 | Pillai |
| 7,592,544 B2 | 9/2009 | Carscallen, II et al. |
| 7,616,127 B2 | 11/2009 | Sorenson, Jr. et al. |
| 7,893,813 B2 | 2/2011 | Nikitin et al. |
| 7,952,464 B2 | 5/2011 | Nikitin et al. |
| 7,978,074 B2 | 7/2011 | Nikitin et al. |
| 8,077,014 B2 | 12/2011 | Park |
| 8,248,210 B2 | 8/2012 | Nikitin et al. |
| 8,258,929 B2 | 9/2012 | Wirrig et al. |
| 8,267,494 B2 | 9/2012 | Addy |
| 8,339,266 B2 | 12/2012 | Nikitin et al. |
| 8,556,178 B2 | 10/2013 | Wang et al. |
| 8,564,412 B2 | 10/2013 | Nikitin et al. |
| 8,596,533 B2 | 12/2013 | Qu et al. |
| 8,659,397 B2 | 2/2014 | Vargo et al. |
| 8,773,266 B2 | 7/2014 | Starr et al. |
| 8,791,795 B2 | 7/2014 | Wang |
| 8,810,369 B2 | 8/2014 | Ackley |
| 8,994,504 B1 | 3/2015 | Schatz et al. |
| 9,041,518 B2 | 5/2015 | Vargas et al. |
| 9,081,994 B2 | 7/2015 | Zumsteg |
| 9,189,719 B2 | 11/2015 | Bremer |
| 9,213,960 B2 | 12/2015 | Vargas et al. |
| 9,246,208 B2 | 1/2016 | Qu et al. |
| 9,256,767 B2 | 2/2016 | Wang |
| 9,264,231 B2 | 2/2016 | Dean |
| 9,292,716 B2 | 3/2016 | Winoto et al. |
| 9,378,399 B2 | 6/2016 | Zhang et al. |
| 9,436,857 B2 | 9/2016 | Wang et al. |
| 9,443,119 B2 | 9/2016 | Zumsteg |
| 9,542,637 B2 | 1/2017 | Raven et al. |
| 9,619,683 B2 | 4/2017 | Zumsteg |
| 9,665,750 B2 | 5/2017 | Nikitin et al. |
| 9,727,763 B2 | 8/2017 | Nikitin et al. |
| 9,872,135 B2 | 1/2018 | Leland et al. |
| 9,892,289 B2 | 2/2018 | Zumsteg et al. |
| 2004/0046643 A1 | 3/2004 | Becker et al. |
| 2006/0138229 A1 | 6/2006 | Sugiyama |
| 2007/0040689 A1 | 2/2007 | Reynolds |
| 2007/0120670 A1 | 5/2007 | Torchalski |
| 2009/0190987 A1* | 7/2009 | Vleurinck ............... B41J 3/4075 400/76 |
| 2011/0018689 A1* | 1/2011 | McAllister ............ B65C 9/1865 340/10.1 |
| 2011/0050421 A1 | 3/2011 | Duron et al. |
| 2013/0135082 A1 | 5/2013 | Xian et al. |
| 2013/0181815 A1 | 7/2013 | Wang et al. |
| 2013/0221098 A1 | 8/2013 | Wang et al. |
| 2014/0027511 A1 | 1/2014 | Plocher et al. |
| 2014/0347165 A1 | 11/2014 | Bremer |
| 2015/0002273 A1 | 1/2015 | Bremer et al. |
| 2015/0041541 A1 | 2/2015 | Qu et al. |
| 2015/0084744 A1 | 3/2015 | Havens |
| 2016/0180125 A1 | 6/2016 | Schuster et al. |
| 2016/0188920 A1 | 6/2016 | Kelly et al. |
| 2017/0096021 A1 | 4/2017 | Bouverie et al. |
| 2017/0169324 A1* | 6/2017 | Miura ................... B65H 33/00 |
| 2017/0200029 A1 | 7/2017 | Nikitin et al. |
| 2017/0201003 A1 | 7/2017 | Ackley et al. |
| 2017/0364718 A1 | 12/2017 | Finke |
| 2018/0109331 A1 | 4/2018 | Nikitin et al. |
| 2018/0129834 A1 | 5/2018 | Nikitin et al. |

* cited by examiner

METHODS, SYSTEMS, AND APPARATUSES FOR ENCODING A RADIO FREQUENCY IDENTIFICATION (RFID) INLAY

BACKGROUND

Applicant has identified a number of deficiencies and problems associated with conventional RFID printer. Through applied effort, ingenuity, and innovation, many of these identified problems have been solved by developing solutions that are included in embodiments of the present disclosure, many examples of which are described in detail herein.

BRIEF SUMMARY

Exemplary embodiments of the present disclosure relate generally to radio frequency identification (RFID) and, more particularly, to methods, systems, and apparatuses for encoding an RFID inlay.

Various embodiments illustrated herein disclose a Radio Frequency Identification (RFID) printer that includes a media hub configured to receive a media roll and is configured to supply a media from the media roll along a media path. The media includes a plurality of labels. Each label of the plurality of labels comprises an RFID inlay. Further, the RFID printer includes an RFID coupler rotatably positioned adjacent to the media path. Additionally, the RFID printer includes an RFID control system that is communicatively coupled to the RFID coupler. The RFID control system is configured to encode the RFID inlay through the RFID coupler. Further, the RFID inlay encoder includes a media sensor configured to generate input signals indicative of positions of the plurality of labels along the media path with respect to the media sensor. Additionally, the RFID inlay encoder includes a processor communicatively coupled to the RFID control system and the media sensor. The processor is configured to determine a real-time position of a first label of the plurality of labels while the media travels along the media path based on the input signals from the media sensor. The first label includes a first corresponding RFID inlay. Further, the processor is configured to cause the RFID control system to initiate encoding of the first corresponding RFID inlay. Furthermore, the processor is configured to cause the RFID coupler to rotate based on the real-time position of the first label. The RFID control system continues encoding of the first corresponding RFID inlay until the first corresponding RFID inlay is successfully encoded.

In some embodiments, the processor in the RFID printer is configured to cause the RFID printer to operate in a calibration mode, wherein the processor, in the calibration mode, is further configured to cause the media to travel by a first travel distance along the media path. Further, the processor is configured to cause the RFID control system to initiate a first encoding attempt to encode a second corresponding RFID inlay on a second label of the plurality of labels.

In an example embodiment, in the calibration mode, the processor is further configured to, in response to determining that the first encoding attempt is unsuccessful, (1) cause the RFID coupler to rotate by a predetermined angle, and (2) cause the RFID control system to initiate another encoding attempt to encode the second corresponding RFID inlay. Further, the processor may repeat steps (1) and (2) until the second corresponding RFID inlay is successfully encoded. Furthermore, the processor is configured to determine an angle of the RFID coupler at which the encoding of the second corresponding RFID inlay is successful. Additionally, the processor is configured to determine a real-time position of the second label at which the encoding of the second corresponding RFID inlay on the second label is successful based on the input signal generated by the media sensor. The processor is further configured to generate an angle correlation between the determined angle of the RFID coupler and the determined position of the second label.

In an example embodiment, the processor, in the calibration mode, is further configured to, in response to determining that the first encoding attempt is successful: cause the media to travel by the first travel distance along the media path. Further, the processor causes the RFID coupler to rotate to a default angle. Additionally, the processor causes the RFID coupler to initiate a second encoding attempt to encode the second corresponding RFID inlay on the second label of the plurality of labels.

In an example embodiment, the processor, in the calibration mode, is further configured to, in response to determining that the first encoding attempt to encode the second corresponding RFID inlay is successful: cause the RFID coupler to rotate by a predetermined angle; and cause the RFID control system to initiate a second encoding attempt to encode the second corresponding RFID inlay.

In an example embodiment, the processor, in the calibration mode, is further configured to, in response to determining that the first encoding attempt is unsuccessful: (1) cause the RFID coupler to rotate by a predetermined angle; (2) cause the RFID control system to initiate another encoding attempt to encode the second corresponding RFID inlay. Further, the processor is configured to repeat steps (1) and (2) until the encoding of the second corresponding RFID inlay is consecutively unsuccessful for a predetermined encoding count.

In an example embodiment, the processor, in the calibration mode, is further configured to: in response to determining that encoding is unsuccessful for the predetermined encoding count: determine one or more angles of the RFID coupler at which the encoding of the second corresponding RFID inlay is successful. Further, the processor determines a position of the second label at which the encoding of the second corresponding RFID inlay on the second label is successful based on the input signal generated by the media sensor. Furthermore, the processor generates an angle correlation between the one or more determined angles of the RFID coupler and the determined position of the second label. Additionally, the processor causes the media to travel by the first travel distance along the media path. The processor further determines a minimum angle amongst the one or more angles and causes the RFID coupler to rotate to the minimum angle. The processor further causes the RFID control system to initiate another encoding attempt to encode the second corresponding RFID inlay.

In an example embodiment, the processor, in the calibration mode, is further configured to: determine an angle of the RFID coupler; cause the RFID coupler to initiate encoding attempt to encode the second corresponding RFID inlay at a plurality of power settings; determine, for each of the plurality of power settings, whether the encoding of the second corresponding RFID inlay is successful; and generate a power correlation between the angle of the RFID coupler and the plurality of power settings of the RFID coupler based on the determination whether the encoding of the second corresponding RFID inlay is successful at each of the plurality of power settings.

In an example embodiment, the processor, in the calibration mode, is further configured to: in response to determining that the first encoding attempt is unsuccessful: (1) modify a power setting of the RFID coupler, and (2) cause the RFID control system to initiate another encoding attempt to encode the second corresponding RFID inlay. Further, the processor repeats steps (1) and (2) until at least the second corresponding RFID inlay is successfully encoded or the RFID control system has attempted to encode the second corresponding RFID inlay at each of a plurality of power settings.

In an example embodiment, the processor, in the calibration mode, is further configured to: in response to determining that the RFID control system has attempted to encode the second corresponding RFID inlay at each of the plurality of power settings: reset the power setting of the RFID coupler; cause the RFID coupler to rotate by a predetermined angle; and cause the RFID control system to initiate another encoding attempt to encode the second corresponding RFID inlay. In an embodiment, the processor, in the calibration mode, is further configured to: in response to determining that the RFID control system has successfully encoded the second corresponding RFID inlay: determine the power setting of the RFID coupler; determine an angle of the RFID coupler; determine the position of the second label based on the input signals generated by the media sensor; generate an angle correlation between the determined angle of the RFID coupler and the determined position of the second label; and generate a power correlation between the determined power setting of the RFID coupler and the determined angle of the RFID coupler.

In an example embodiment, the processor is further configured to reset the angle and the power setting of the RFID coupler when a total distance travelled by the media during the calibration mode is equal to a second travel distance.

Various embodiments illustrated herein disclose a method for encoding a Radio Frequency Identification (RFID) inlay. The method includes causing, by a processor, a media to travel along a media path in an RFID printer. The media includes a plurality of labels, wherein each label of the plurality of labels comprises an RFID inlay. Further, the method includes determining, by the processor, a real-time position of a first label while the media travels along the media path based on an input signal received from a media sensor, wherein the first label includes a first corresponding RFID inlay. Furthermore, the method includes causing, by the processor, an RFID control system to initiate encoding of the first corresponding RFID inlay. Additionally, the method includes causing, by the processor, the RFID coupler to rotate based on the real-time position of the first label. The processor causes the RFID control system to continue encoding of the first corresponding RFID inlay, until the first corresponding RFID inlay is successfully encoded.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
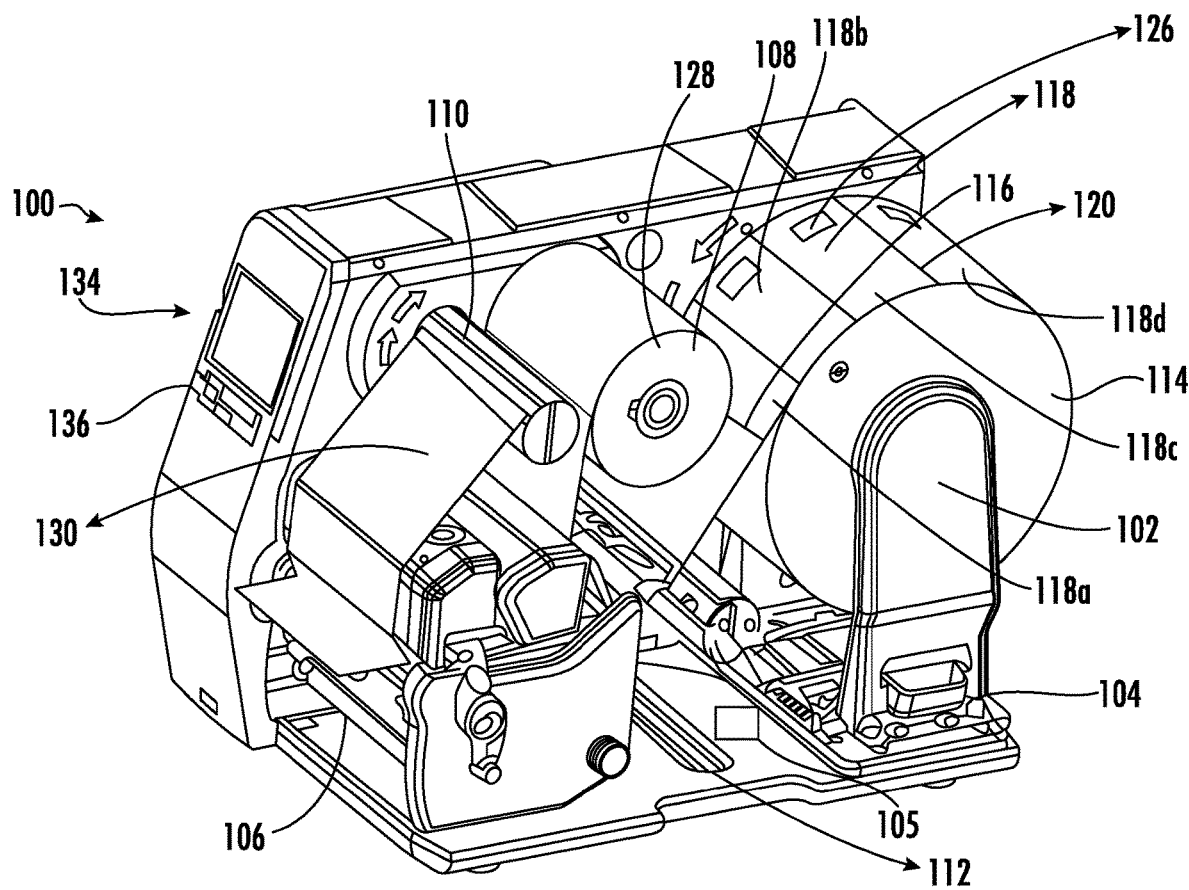
FIGS. 1A-1C illustrate an RFID printer, according to the one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "radio frequency identification (RFID) inlay" is used herein to correspond to an RFID tag that includes an integrated circuit (IC), an antenna element, and a substrate. In an example embodiment, the antenna element and the IC are fabricated on the substrate. Further, the IC is communicatively coupled to the antenna element through an interconnect on the substrate. In an example embodiment, the integrated circuit in the RFID inlay may be configured to store encoded information or the encoded data. In some examples the RFID inlay may be configured to operate in various RF frequency bands such as, but not limited to, 13.56 MHz (hereinafter High Frequency Band) or 860 MHz-960 MHz (UHF band). In some example embodiments, the RFID inlay may have a dedicated power source that may enable the RFID inlay to communicate with one or more components, such as an RFID encoder and an RFID reader. Such RFID inlays are referred to as active RFID inlays. In alternative example embodiments, the RFID inlay may not have a dedicated power source. In such embodiments, the RFID inlay may have a power coupler that is capable of inducing electrical charge when the RFID inlay is brought in an RF field. The induced electrical charge is thereafter used to power the RFID inlay itself.

The word "media" is used herein to mean a printable medium, such as a page or paper, on which content, such as graphics, text, and/or visual images, may be printable. In some embodiments, the media may correspond to a continuous media that may be loaded in an RFID printer in form of a roll or a stack, or may correspond to media that may be divided into a plurality of labels through perforations defined along a width of the media. Alternatively or additionally, the media may be divided into the plurality of labels through one or more marks that are defined at a predetermined distance from each other, along the length of the media. In some example embodiments, a contiguous stretch of the media, between two consecutive marks or two consecutive perforations, corresponds to a label of the media. In an example embodiment, each label of the plurality of labels includes a corresponding RFID inlay.

Various embodiments describe an RFID printer, such as an RFID printer, that is capable of encoding an RFID inlay provided on a plurality of labels in a media. The RFID printer defines a travel path along which a media in the RFID printer traverses. In some examples, the media includes a plurality of labels, and each label of the plurality of labels further include an RFID inlay. For encoding the RFID inlay, the RFID printer may facilitate traversal of the media along the media path, and an RFID coupler, rotatably positioned adjacent to the media path, facilitates encoding of the RFID inlay provided on each of the plurality of labels. Because the RFID coupler is rotatably positioned adjacent to the media path, the RFID coupler facilitates encoding the RFID inlay on the plurality of labels while the media traverses along the media path. Therefore, various embodiments of the present invention eliminate the need to adjust the position of the RFID inlay prior to encoding, and reduces time consumption and improves the overall productivity of the RFID printer.

To encode the RFID inlay on a label of the plurality of labels while the media traverses along the media path, a media sensor (in the RFID printer) generates an input signal as the media traverses along the media path. Based on the input signal, a processor in the RFID printer is configured to determine a real-time location of the label (that includes the RFID inlay to be encoded). After determining the real-time location of the label, the processor may cause the RFID coupler to rotate in accordance with the real-time position of the label. Further, the processor may instruct an RFID control system to encode the RFID inlay on the label through the RFID coupler.

In some examples, the RFID coupler is continuously rotating in a clockwise and anti-clockwise direction (in accordance with the traversal of the media along the media path) and continues encoding the RFID inlay until the RFID control system determines that the encoding of the RFID is complete. The continuous rotation of the RFID inlay is based on the real-time position of the label.

As described above, the RFID printer according to various embodiments does not require position adjustment of the media in order to precisely align the RFID inlay with the RFID coupler. Therefore, the RFID printer is much more efficient. Further, because the RFID printer according to the various embodiments encodes the RFID inlay as the media traverses along the media path, there is no need to halt the traversal of the media in order to enable the RFID coupler to encode the RFID inlay.

Figure 1B:
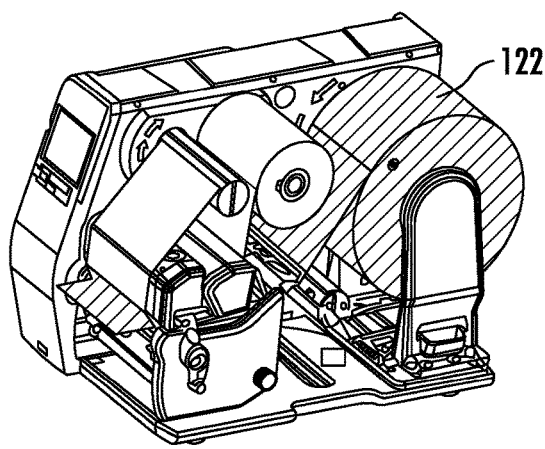
Figure 1C:
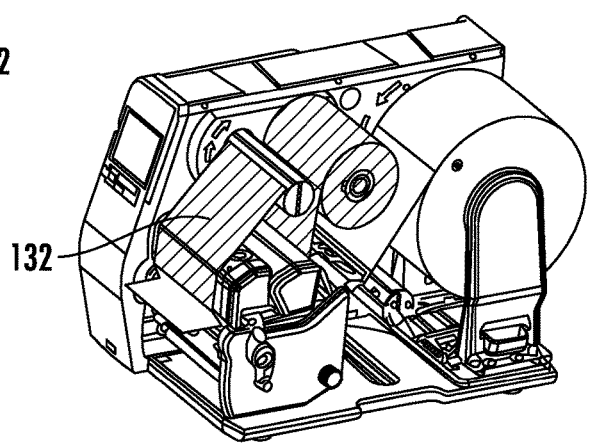

FIGS. 1A-1C illustrate an RFID printer 100, according to the one or more embodiments described herein. The RFID printer 100 may include a media hub 102, an RFID coupler 104, an RFID control system 105, and a media output slot 106. In some examples, the RFID printer 100 further includes a ribbon drive assembly 108, a ribbon take-up hub 110, and a print head 112.

In some example embodiments, the media hub is configured to receive a media roll 114. In some examples, the media roll 114 may correspond to a roll of a media 116 that may have a plurality of labels 118. The plurality of labels 118 may be defined on the media 116 by means of perforations 120. In alternative embodiments, the plurality of labels 118 may be defined on the media 116 by means of one or more marks (not shown). In some examples, the media hub 102 may be coupled to a first electrical drive (not shown) that actuates the media hub 102. On actuation, the media hub 102 causes the media roll 114 to rotate, which further causes the media 116 to travel/traverse along a media path 122 (as shown in the shaded portion in FIG. 1B).

In some example embodiments, the scope of the disclosure is not limited to the media hub 102 facilitating supply of the media 116 along the media path 122. In alternative embodiment, the RFID printer 100 may further include a platen roller (an example platen roller is further described in FIG. 2), in addition to the media hub 102, that may be positioned along the media path 122. In such an embodiment, the platen roller may be coupled to the first electrical drive, which actuates the platen roller. On actuation, the platen roller may be configured to pull the media 116 from the media roll 114 (mounted on the media hub 102), causing the media 116 to travel along the media path 122.

Additionally or alternately, the first electrical drive may be coupled to both the platen roller and the media hub 102 such that both the platen roller and the media hub 102 operate in sync. Such configuration of the RFID printer 100 (that includes the platen roller and the media hub 102) is further described in conjunction with FIG. 2.

The RFID coupler 104 corresponds to an antenna element that is positioned adjacent to the media path 122. In some examples, the RFID coupler 104 is coupled to a second electrical drive that enables the RFID coupler 104 to rotate around an axis A-A'. In an example embodiment, the RFID coupler 104 may facilitate encoding of an RFID inlay 126 provided on each of the plurality of labels 118 (on the media 116), while the media traverses along the media path 122, as further described in conjunction with FIG. 16.

The RFID control system 105 may include suitable logic and circuitry to control the operation of at least the RFID coupler 104. For example, the RFID control system 105 includes an RFID encoder and an RFID reader (described later in conjunction with FIG. 3) that may cause the RFID coupler 104 to encode and read the RFID inlay 126, respectively. The structure and operation of the RFID control system 105 has been described in conjunction with FIG. 3.

In some examples, as discussed above, the RFID control system 105 causes the RFID coupler 104 to encode the RFID inlay 126 on one of the labels 118 of the plurality of labels while the media 116 traverses along the media path 122. Therefore, subsequent to the encoding of the RFID inlay 126, the encoded RFID inlay 126 is outputted from the media output slot 106. In an example embodiment, the media output slot 106 corresponds to a slot in a housing of the RFID printer 100, through which the label 118 with encoded RFID inlay 126 is outputted.

In addition to encoding the RFID inlay 126 provided on each of the labels 118, the RFID printer 100, in some example implementations, may print content on the labels 118. To facilitate printing of the content on the labels 118, the RFID printer 100 may further include the ribbon drive assembly 108, the ribbon take-up hub 110, and the print head 112.

The ribbon drive assembly 108 may receive a ribbon roll 128 that corresponds to a roll of a ribbon 130. In an example embodiment, the ribbon 130 may correspond to an ink media that is utilized to dispose ink onto the media 116 to print content on the media 116 (e.g., label 118). In some example implementations, the ribbon drive assembly 108 may be coupled to a third electrical drive that may be configured to actuate the ribbon drive assembly 108. On actuation, the ribbon drive assembly 108 rotates, which in turn causes the ribbon roll 128 to rotate and supply the ribbon 130 along a ribbon path 132 (as shown in the shaded in FIG. 1C). Along the ribbon path 132, the ribbon 130 traverses from the ribbon drive assembly 108 to the print head 112 and further to the ribbon take-up hub 110.

In an example embodiment, the ribbon take-up hub 110 may correspond to an assembly that may receive used ribbon (i.e., a section of the ribbon 130 from which the ink has been is disposed on the media 116). The ribbon take-up hub 110 may also be coupled to the third electrical drive that may be configured to actuate the ribbon take-up hub 110. On actuation, the ribbon take-up hub 110 pulls the ribbon 130 from the ribbon roll 128, causing the ribbon 130 to move along the ribbon path 132. In an example embodiment, the third electrical drive (coupled to both the ribbon drive assembly 108 and the ribbon take-up hub 110) enables synchronized operation of the ribbon drive assembly 108 and the ribbon take-up hub 110 such that the amount of ribbon released by the ribbon roll 128 is equal to the amount of ribbon received by the ribbon take-up hub 110. For example, a length of the ribbon 130 released by the ribbon roll 128 is same as the length of the ribbon 130 received by the ribbon take-up hub 110.

The print head 112 may correspond to a component that is configured to print the content on the media 116 (e.g., label 118). In an example embodiment, the print head 112 is provided on the media path 122 and the ribbon path 132. The print head 112 includes a plurality of heating elements (not shown) that are energized and pressed against the ribbon 130 to perform a print operation. During the print operation, the print head 112 concurrently applies heat on a section of the ribbon 130 and presses the ribbon 130 against the media 116 to transfer the ink on the media 116. In some examples, after the print operation, the media 116 and the ribbon 130 traverse along the media path 122 and the ribbon path 132, respectively, such that the printed media is outputted from the media output slot 106 and the used ribbon traverses to the ribbon take-up hub 110.

In an example embodiment, the RFID printer 100 may be configured to operate in one or more modes. The one or more modes may include, but not limited to, a calibration mode and an encoding mode. In an example embodiment, in the calibration mode, the RFID printer 100 is configured to calibrate itself, as further described in conjunction with FIGS. 6 and 12. In an example embodiment, in the encoding mode, the RFID printer 100 is configured to perform the encoding operation, as further described in conjunction with FIG. 16.

In some example embodiments, the RFID printer 100 may further include an input panel 134 that further includes one or more buttons 136. The one or more buttons may correspond to input devices through which a user of the RFID printer 100 may provide inputs, causing the RFID printer 100 to perform a predetermined operation. For example, the user of the RFID printer 100 may provide input through the one or more buttons 136 to configure the RFID printer 100 in the calibration mode. Some examples of the one or more buttons 136 may include, but are not limited to push buttons, soft push buttons, touch buttons, and/or the like.

Figure 2A:
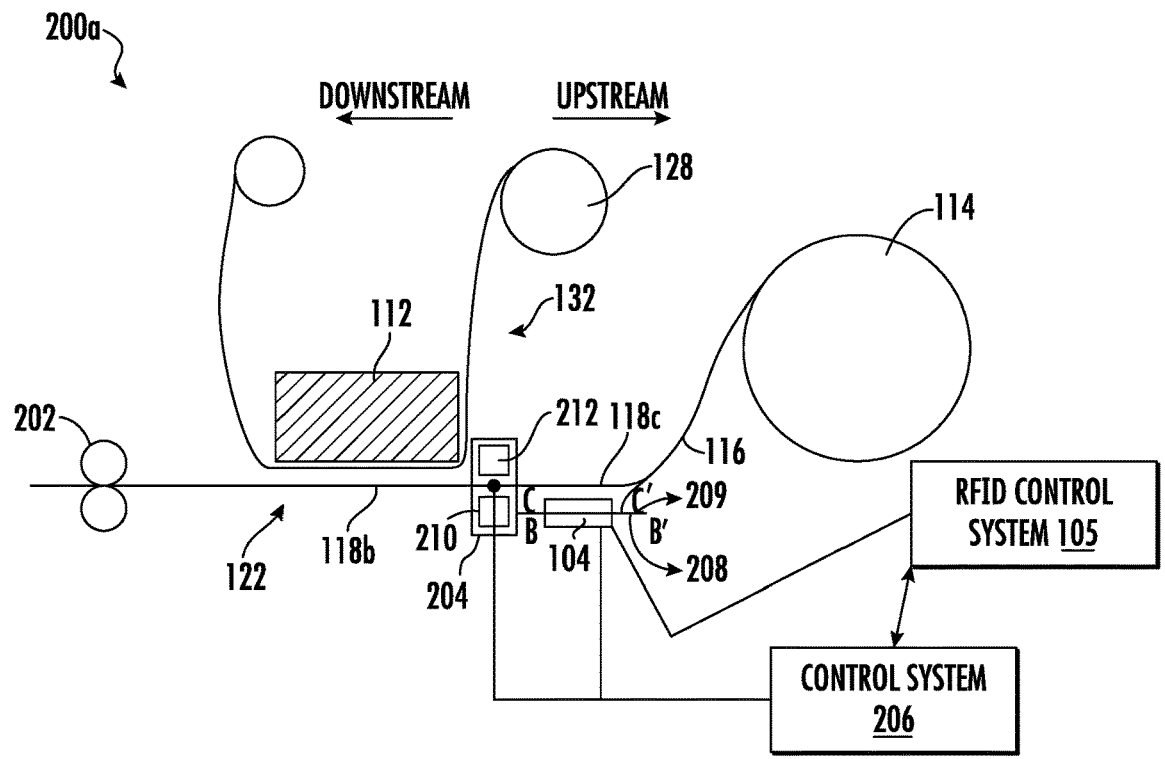
FIGS. 2A-2B illustrate schematics of the RFID printer, according to one or more embodiments described herein.
Figure 2B:
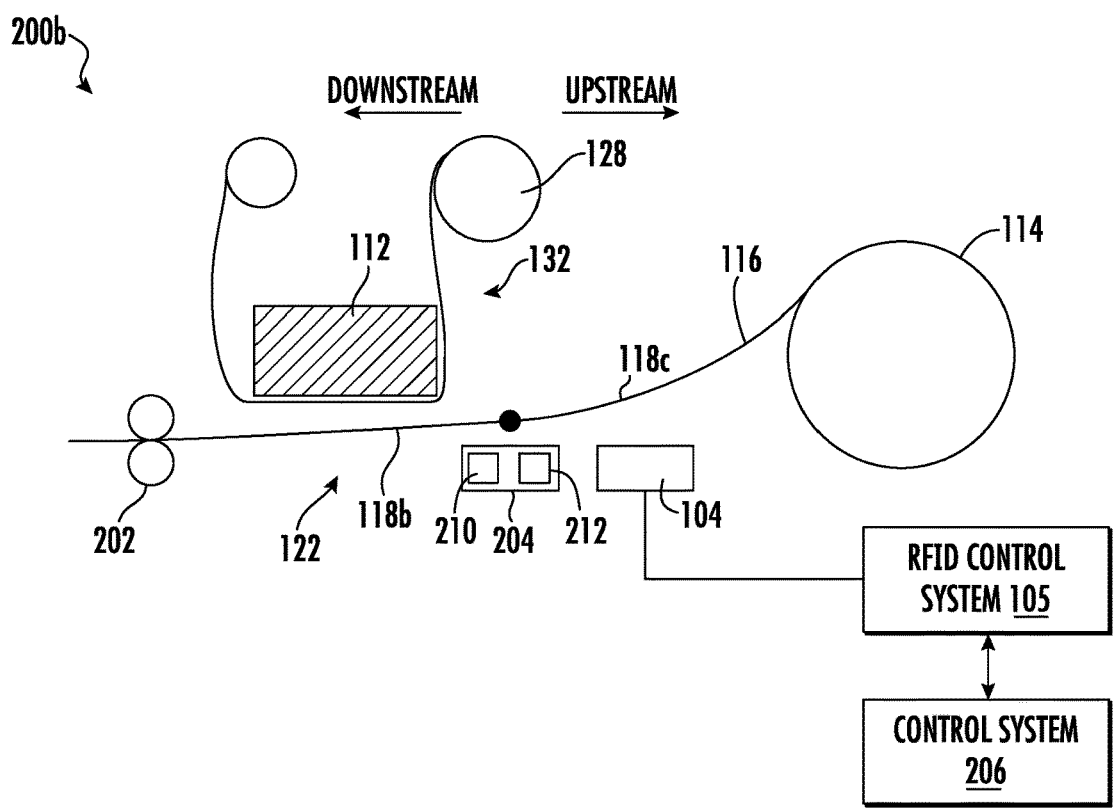

FIGS. 2A and 2B illustrate schematics 200a and 200b of the RFID printer 100, according to one or more embodiments described herein. The schematics 200a and 200b of the RFID printer 100 illustrate that the RFID printer 100 may further include a platen roller 202, a media sensor 204, and a control system 206 in some embodiments. The schematics 200a and 200b of the RFID printer 100 further depicts the media path 122, and the ribbon path 132. Further, the schematics 200a and 200b illustrate that the RFID coupler 104 is positioned adjacent to the media path 122 such that the RFID coupler 104 is pointed towards the media 116 on the media path 122. Further, the RFID coupler 104 is positioned upstream of the print head 112 and the media sensor 204. In an example embodiment, the term "upstream" according to the one or more embodiments described herein corresponds to a direction opposite to media traversal direction along the media path 122 during encoding of the RFID inlay 126 on the labels 118. In an example embodiment, the term "downstream" according to the one or more embodiments described herein corresponds to a direction same as the media traversal direction along the media path 122 during encoding of the RFID inlay 126 on the labels 118.

As shown in FIG. 2A, a B-B' axis 208 is parallel to the media path 122 and passes through the RFID coupler 104. Further, a C-C' axis 209 corresponds to a central longitudinal line of the RFID coupler 104, which also passes through the RFID coupler 104. The B-B' axis 208 intersects with the C-C' axis 209, forming an angle between the B-B' axis 208 and the C-C' axis 209. Hereinafter, the angle between the C-C' axis 209 and the B-B' axis 208 is referred to as the RFID coupler angle.

In FIG. 2A, the RFID coupler 104 is parallel to the media path 122, and therefore, the angle between the B-B' axis 208 and the C-C' axis 209 is zero. In some embodiments, this is referred to as the default RFID coupler angle. In another example embodiment, when the RFID coupler 104 rotates (on actuation of the second electrical drive), the C-C' axis rotates in accordance with the rotation of the RFID coupler 104, and the angle between the C-C' axis 209 and the B-B' axis 208 changes.

In an example embodiment, the RFID coupler 104 is rotatable within an RFID coupler angle range. For example, the RFID coupler 104 may be rotatable within 0 degrees to +90 degrees. In another example, the RFID coupler 104 may be rotatable within 0 degrees to +180 degrees. Referring back to the schematics 200a and 200b, the print head 112 is positioned downstream of the media roll 114 along the media path 122, and downstream of the ribbon roll 128 along the ribbon path 132.

In an example embodiment, the print head 112 is positioned on top of both the ribbon path 132 and the media path 122. Further, the ribbon path 132 is more proximate to the print head 112 in comparison to the media path 122. In other words, the ribbon 130 is positioned above the media 116 and more proximate to the print head 112 in comparison to the media 116. During the print operation, the print head 112 moves in a vertically downward direction to press the ribbon 130 against the media 116 to perform the print operation.

In an example embodiment, the platen roller 202 is positioned downstream of the print head 112 along the media path 122. As discussed above, the platen roller 202 is coupled to the first electrical drive that enables the platen roller 202 to rotate and pull the media 116 from the media roll 114, and accordingly cause the media 116 to travel along the media path 122.

The media sensor 204 may correspond to a sensor that is configured to detect a presence of the media 116 on the media path 122. In an example embodiment, the media sensor 204 is positioned upstream of the print head 112 and downstream of the RFID coupler 104. In some example embodiments, the media sensor 204 may be configured to detect the presence of the media 116 by determining transmissivity and/or reflectivity of the media 116. In an example embodiment, the transmissivity of the media 116 may correspond to a measure of an intensity of a light signal that the media 116 allows to pass through it. In an example embodiment, the reflectivity of the media 116 may correspond to a measure of an intensity of light signal that gets reflected from a surface of the media 116.

In an example embodiment, the media sensor 204 includes a light transmitter 210 and a light receiver 212. The light transmitter 210 may correspond to a light source, such as a Light Emitting Diode (LED), a LASER, and/or the like. The light transmitter 210 may be configured to direct the light signal on the media path 122.

The light receiver 212 may correspond to at least one of a photodetector, a photodiode, or a photo resistor. The light receiver 212 may generate an input signal based on an intensity of the light signal received by the light receiver 212. In an example embodiment, the input signal may correspond to a voltage signal, where one or more characteristics of the voltage signal, such as the amplitude of the voltage signal and frequency of the voltage signal, are directly proportional to the intensity of the portion of the light signal received by the light receiver 212.

In operation, the light transmitter 210 of the media sensor 204 may be configured to direct the light signal on the media path 122. If the media 116 is present on the media path 122, a portion of light signal may get reflected from the surface of the media 116. To detect the portion of the light signal reflected from the surface of the media 116, the light receiver 212 and the light transmitter 210 may be, in some examples, positioned in the same plane, as is depicted in the schematic 200b in FIG. 2B. In another example, the light receiver 212 may be positioned below the media path 122, and/or may not be positioned in the same plane as that of the light transmitter 210, without departing from the scope of the disclosure. The light receiver 212 may receive the portion of the light signal, and based on the intensity of the portion of the received light signal, the light receiver 212 generates the input signal. In some implementations, where the media 116 is not present on the media path 122, the light receiver 212 may not receive the portion of the light signal (transmitted by the light transmitter), and therefore may not generate the input signal. Accordingly, based on the input signal generated by the media sensor 204, the presence of the media 116 on the media path 122 may be determined.

Additionally or alternatively, the media sensor 204 may determine the presence of the media 116 on the media path 122 based on the transmissivity of the media 116. In such an implementation, the light receiver 212 may receive the portion of the light signal that passes through the media 116. To receive the portion of the light signal that passes through the media 116, the light receiver 212 is spaced apart from the light transmitter 210 in such a manner that the media of media roll 114 passes through a space between the light receiver 212 and the light transmitter 210. When the light transmitter 210 directs the light signal on the media 116, the portion of the light signal passes through the media 116, which is then received by the light receiver 212. The light receiver 212, thereafter, may generate the input signal in accordance with the intensity of the portion of light signal received.

In some embodiments, the media sensor 204 may be utilized to detect a start portion and an end portion of the label 118a of the plurality of labels 118 in the media 116. In an example embodiment, the start portion of the label 118a may correspond to a first perforation between the label 118a and another label preceding the label 118a. In an example embodiment, the end portion of the label 118a may correspond to a second perforation between the label 118a and a yet another label succeeding the label 118a. As discussed above, the media 116 may include the plurality of labels 118 that are separated either by perforations 120 or by the one or more marks (not shown). Therefore, when such marks or perforations 120 on the media 116 passes over the media sensor 204 during traversal of the media 116 along the media path 122, the media sensor 204 may detect a sudden increase/decrease in the measure of transmissivity/reflectivity of media 116. Such sudden increase/decrease in the measure of the transmissivity/reflectivity of media 116 is reflected in the input signal generated by the media sensor 204. For example, the input signal generated by the media sensor 204 may include peaks or valleys indicating a sudden increase or decrease in the measure of the transmissivity/reflectivity of media 116. Such peaks and valleys may be utilized to determine the start portion or the end portion of the label of the plurality of labels 118.

Referring to the FIGS. 2A and 2B, the RFID control system 105 is communicatively coupled to the RFID coupler 104 and the control system 206. The control system 206 may include suitable logic and circuitry to control the operation of the RFID printer 100. In an example embodiment, the control system 206 may be communicatively coupled to one or more components of the RFID printer 100. For example, the control system 206 may be communicatively coupled to the print head 112, the media sensor 204, the RFID control system 105, the first electrical drive (associated with the media hub 102 and the platen roller 202), the third electrical drive (coupled to the ribbon drive assembly 108 and the ribbon take-up hub 110), and the second electrical drive (coupled to the RFID coupler 104). The structure of the control system 206 is further described in conjunction with FIG. 4.

In some example embodiments, the scope of the disclosure is not limited to the RFID printer 100 that performs both the RFID inlay encoding and the printing operation. In some example implementations, the RFID printer 100 may not perform the printing operation and may only perform the RFID inlay encoding operation. In such implementation, the RFID printer 100 may not include the print head 112, the ribbon drive assembly 108, and the ribbon take-up hub 110.

Figure 3:
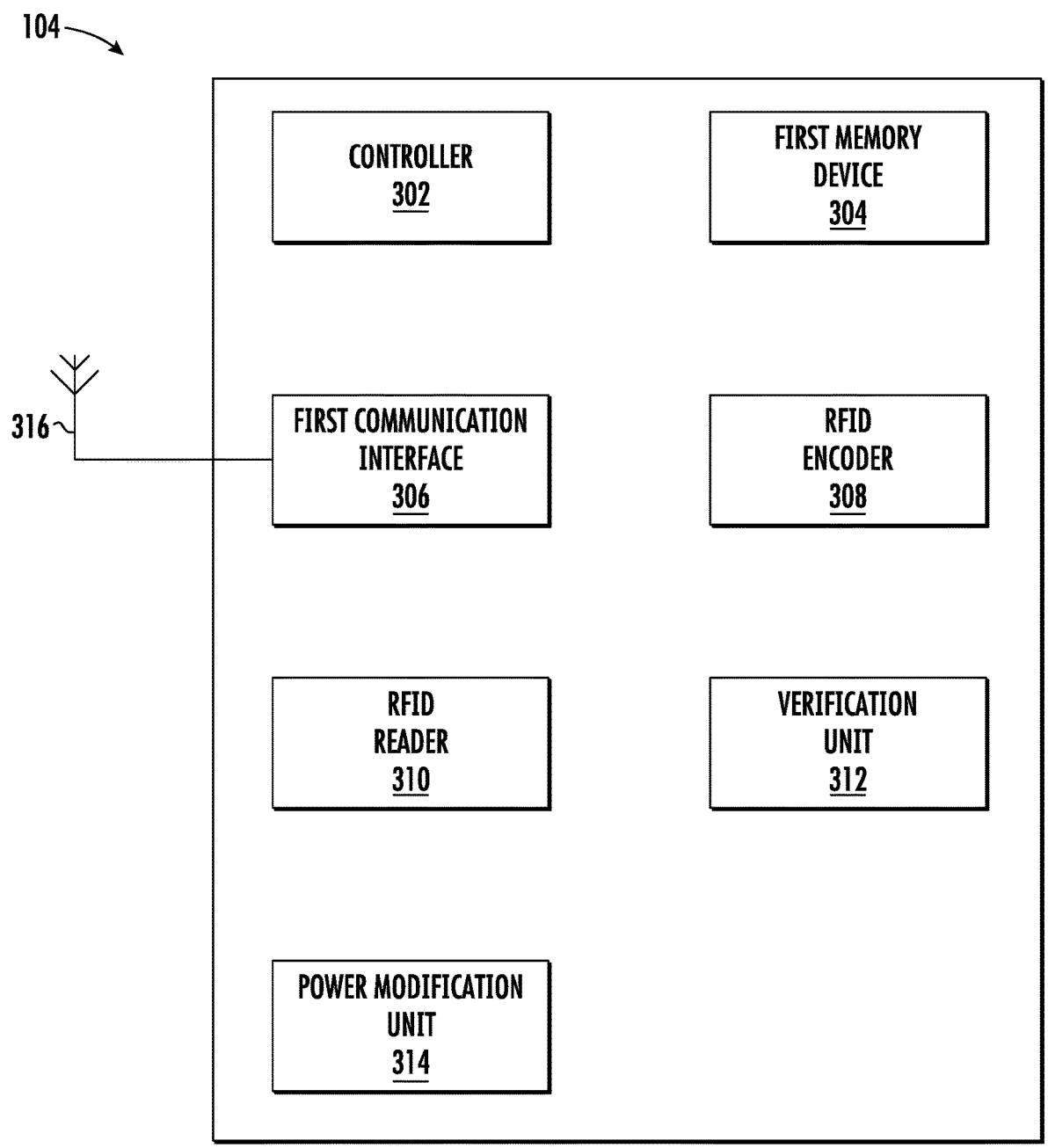
FIG. 3 illustrates a block diagram of an RFID encoder, according to one or more embodiments described herein.

FIG. 3 illustrates a block diagram of the RFID control system 105, according to one or more embodiments described herein. The RFID control system 105 includes a controller 302, a first memory device 304, a first communication interface 306, an RFID encoder 308, an RFID reader 310, a verification unit 312, and a power modification unit 314.

The controller 302 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single controller, in an embodiment, the controller 302 may include a plurality of controllers and signal processing modules. The plurality of controllers may be embodied on a single electronic device or may be distributed across a plurality of electronic devices collectively configured to function as the circuitry of the RFID control system 105. The plurality of controllers may be in operative communication with each other and may be collectively configured to perform one or more functionalities of the circuitry of the RFID control system 105, as described herein. In an example embodiment, the controller 302 may be configured to execute instructions stored in the first memory device 304 or otherwise accessible to the controller 302. These instructions, when executed by the controller 302, may cause the circuitry of the RFID control system 105 to perform one or more of the functionalities, as described herein.

Whether configured by hardware, firmware/software methods, or by a combination thereof, the controller 302 may include an entity capable of performing operations according to embodiments of the present disclosure while configured accordingly. Thus, for example, when the controller 302 is embodied as an ASIC, FPGA or the like, the controller 302 may include specifically configured hardware for conducting one or more operations described herein. Alternatively, as another example, when the controller 302 is embodied as an executor of instructions, such as may be stored in the first memory device 304, the instructions may specifically configure the controller 302 to perform one or more algorithms and operations described herein.

Thus, the controller 302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 304 may include suitable logic, circuitry, and/or interfaces that are adapted to store a set of instructions that is executable by the controller 302 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the first memory device 304 may be integrated with the controller 302 on a single chip, without departing from the scope of the disclosure.

The first communication interface 306 may correspond to a communication interface that may facilitate transmission and reception of messages and data to and from various components of the RFID printer 100. For example, the first communication interface 306 is communicatively coupled with the control system 206. Examples of the communication interface may include, but are not limited to, an antenna, an Ethernet port, a USB port, a serial port, or any other port that can be adapted to receive and transmit data. The communication interface transmits and receives data and/or messages in accordance with the various communication protocols, such as, I2C, TCP/IP, UDP, and 2G, 3G, 4G or 5G communication protocols.

The RFID encoder 308 includes suitable logic, and circuitry for encoding data in the RFID inlay 126 included in the plurality of labels 118 in the media. In some example embodiments, the RFID encoder 308 encodes data in the RFID inlay 126, according to one or more of Electronic Product code (EPC) or Department of Defense (DOD) formats. In some examples, the RFID encoder 308 may be configured to transmit the data (for the purpose of encoding the RFID inlay 126) over one or more frequency bands such as, but not limited to, 13.56 MHz (hereinafter "High Frequency band" or "HF") or 860 MHz-960 Mz (hereinafter "UHF band"), through the antenna element 316. Further, the RFID encoder 308 may be configured to modulate the data on an RF carrier of either HF frequency band or UHF band prior to transmitting the data for encoding the RFID inlay 126. Some examples of the modulation techniques utilized by the RFID encoder 308 include, but are not limited to, Phase Jitter Modulation (PJM), Amplitude Shift Keying (ASK), and/or the like.

In some examples, the RFID encoder 308 may be configured to transmit one or more commands to the RFID inlay 126 on the label 118a of the plurality of the labels 118, causing the RFID inlay 126 to perform a predetermined operation in accordance with the one or more commands. For example, the RFID encoder 308 may transmit a command "Write" that indicates to the RFID inlay 126 to write the data accompanied with the command in the memory of the RFID inlay 126. Similarly, the RFID encoder 308 may transmit other commands to the RFID inlay 126 such as but not limited to "Lock", "Access", "BlockWrite", and/or any other command according to the EPCglobal standards.

The RFID reader 310 includes suitable logic and circuitry for reading data from the RFID inlay (e.g., 126). To read the data encoded in the RFID inlay 126, the RFID reader 310 may transmit an interrogation command to the RFID inlay over the one or more frequency bands such as HF and UHF. Further, similar to the RFID encoder 308, the RFID reader 310 may also utilize the one or more modulation techniques such as ASK and PJM to transmit the interrogation command on the one or more frequency bands. In response to the interrogation command, the RFID reader 310 may receive the encoded data from the RFID inlay 126. In an example embodiment, the RFID reader 310 may utilize the antenna element 316 to transmit the interrogation command and receive the encoded data from the RFID inlay 126.

In some examples, both the RFID reader 310 and the RFID encoder 308 may include one or more of filters, analog to digital (A/D) converters, Digital to Analog (D/A) convertors, matching circuits, amplifiers, and/or tuners that enable the RFID reader 310 and the RFID encoder 308 to transmit and receive data over the one or more frequency bands through the antenna element 316.

Figure 10:
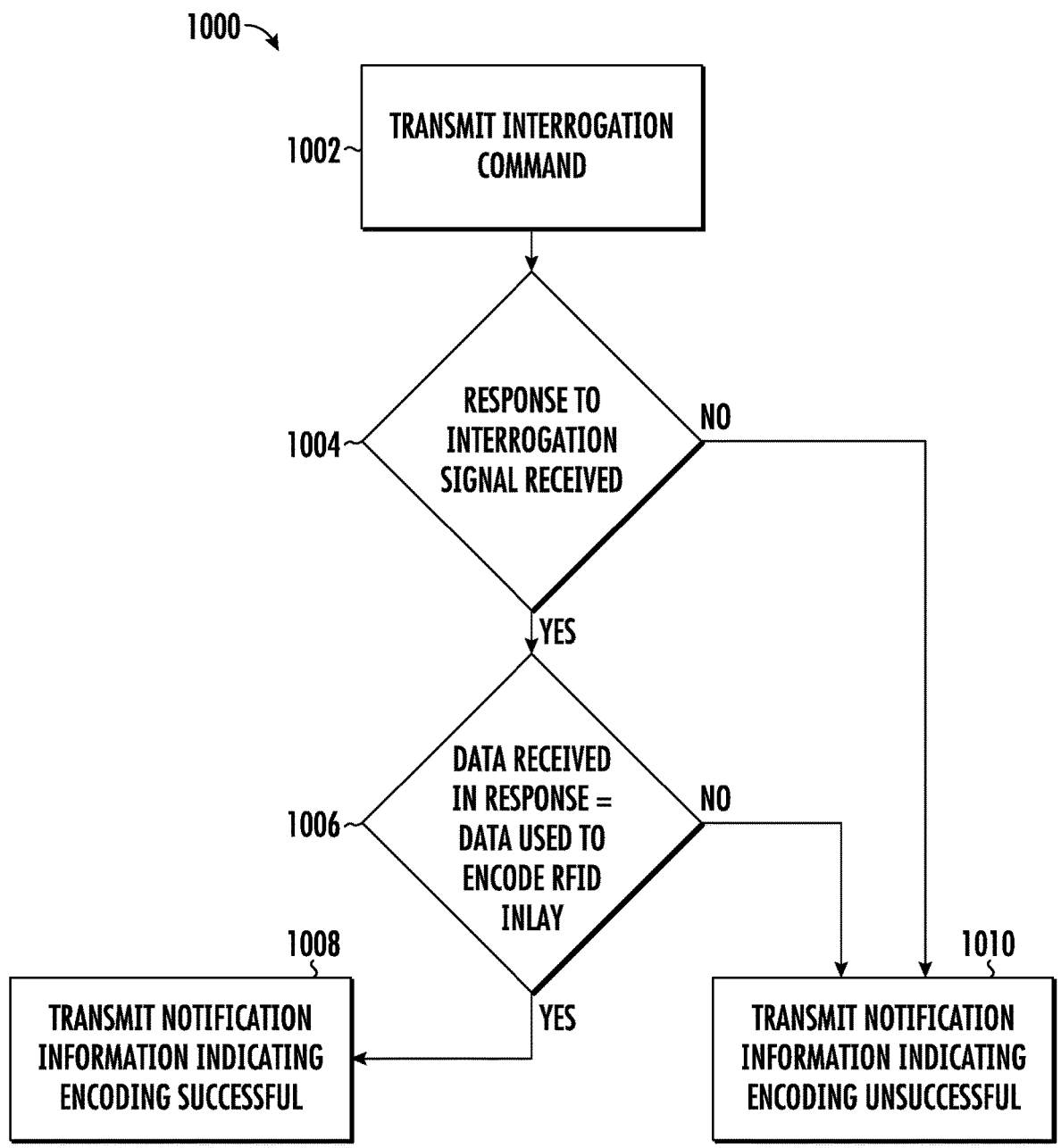
FIG. 10 illustrates a flowchart of a method for verifying whether the RFID inlay has been encoded, according to one or more embodiments described herein.
Figure 13:
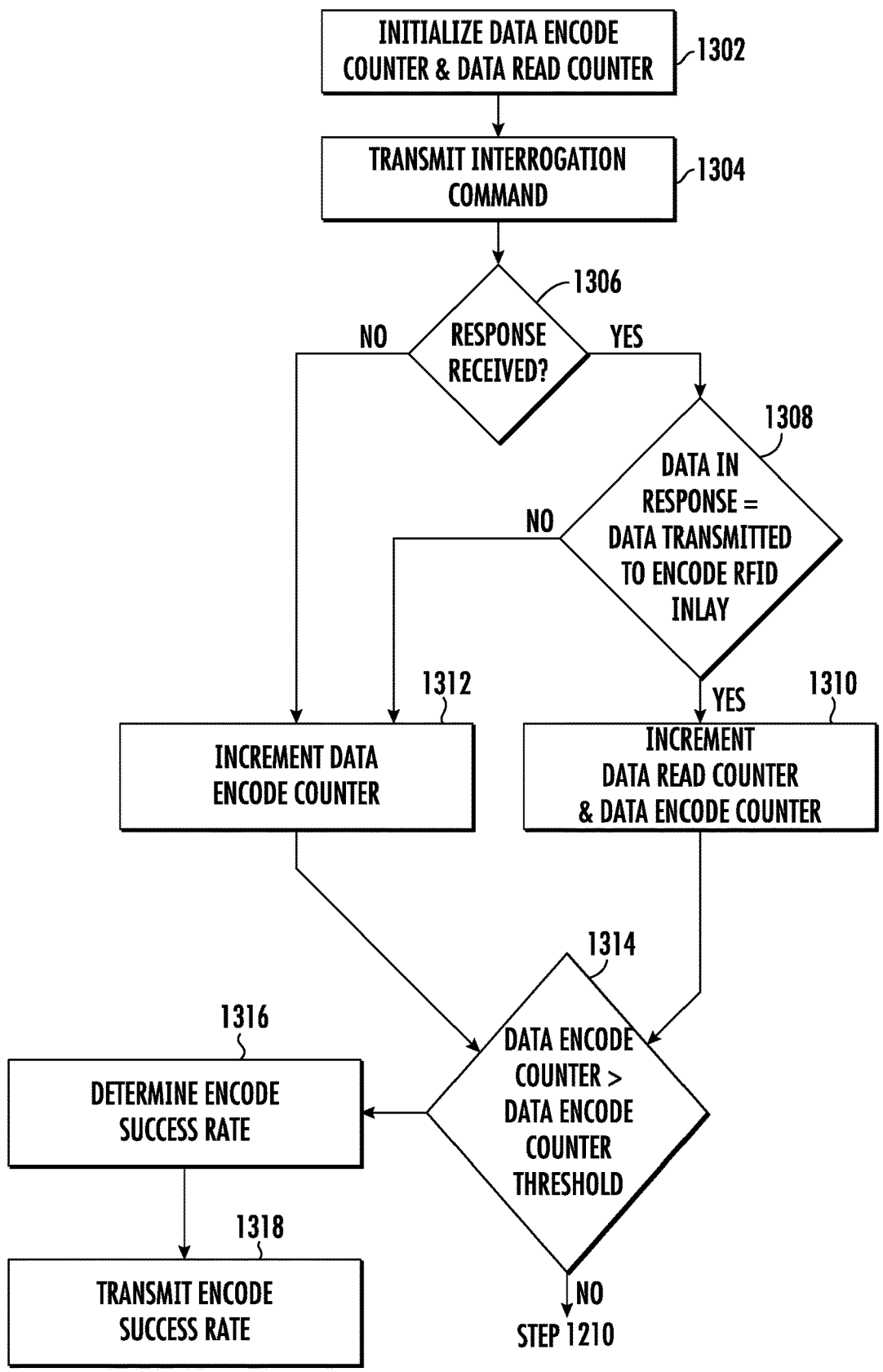
FIG. 13 illustrates a flowchart of a method for verifying whether the data has been encoded in the RFID inlay, according to one or more embodiments described herein.

The verification unit 312 includes suitable logic and circuitry that is configured to verify whether the encoding of the RFID inlay 126 is successful, as further described in FIGS. 10 and 13. In some examples, to determine whether the encoding is successful, the verification unit 312 may determine an encode success rate, as further described in conjunction with FIG. 13. The verification unit 312 may be implemented using one or more hardware components, such as, but not limited to, FPGA, ASIC, and the like.

The power modification unit 314 includes suitable logic and circuitry that is configured to manage a signal transmission power of the RFID coupler 104. In an example embodiment, the signal transmission power corresponds to a transmitter power output at which a signal is transmitted from the RFID coupler 104. In an example embodiment, the power modification unit 314 may be configured to modify the signal transmission power in accordance with a plurality of power settings. In an example embodiment, a power setting may correspond to a value of the signal transmission power with which the data is transmitted from the RFID coupler 104. In some examples, the power modification unit 314 may modify input voltage to the RFID coupler 104 to modify the signal transmission power. In an example embodiment, the power modification unit 314 may modify the signal transmission power in response to an instruction received from the control system 206. The power modification unit 314 may be implemented using one or more hardware components, such as, but not limited to, FPGA, ASIC, and the like.

Figure 4:
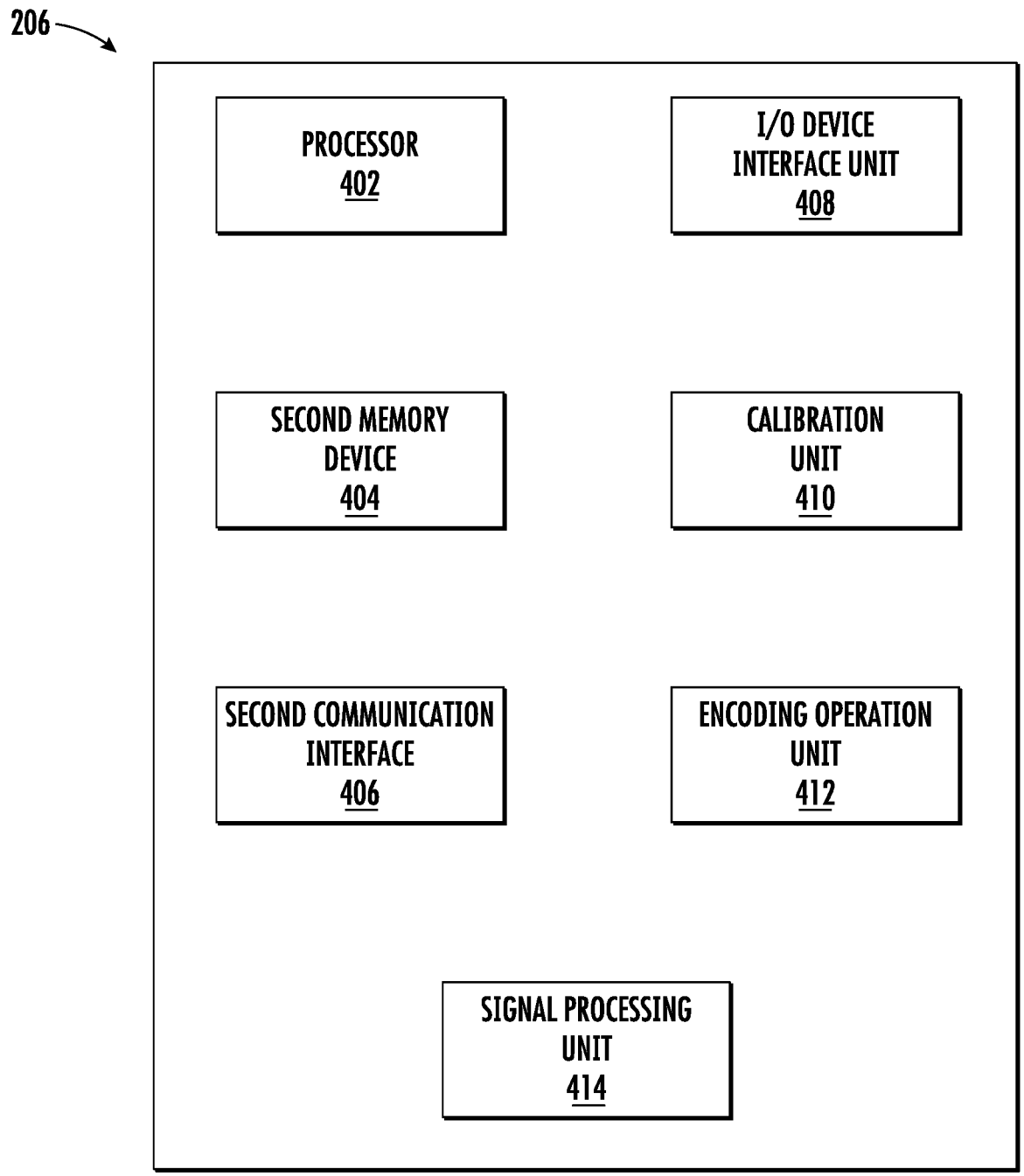
FIG. 4 illustrates a block diagram of a control system of the RFID printer, according to one or more embodiments described herein.

FIG. 4 illustrates a block diagram of the control system 206 of the RFID printer 100, according to one or more embodiments described herein. The control system 206 includes a processor 402, a second memory device 404, a second communication interface 406, an input/output (I/O) device interface unit 408, a calibration unit 410, an encoding operation unit 412, and a signal processing unit 414.

The processor 402 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 4 as a single processor, in an embodiment, the processor 402 may include a plurality of processors and signal processing modules. The plurality of processors may be embodied on a single electronic device or may be distributed across a plurality of electronic devices collectively configured to function as the circuitry of the control system 206. The plurality of processors may be in operative communication with each other and may be collectively configured to perform one or more functionalities of the circuitry of the control system 206, as described herein. In an example embodiment, the processor 402 may be configured to execute instructions stored in the second memory device 404 or otherwise accessible to the processor 402. These instructions, when executed by the processor 402, may cause the circuitry of the control system 206 to perform one or more of the functionalities, as described herein.

Whether configured by hardware, firmware/software methods, or by a combination thereof, the processor 402 may include an entity capable of performing operations according to embodiments of the present disclosure while configured accordingly. Thus, for example, when the processor 402 is embodied as an ASIC, FPGA or the like, the processor 402 may include specifically configured hardware for conducting one or more operations described herein. Alternatively, as another example, when the processor 402 is embodied as an executor of instructions, such as may be stored in the second memory device 404, the instructions may specifically configure the processor 402 to perform one or more algorithms and operations described herein.

Thus, the processor 402 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The second memory device 404 may include suitable logic, circuitry, and/or interfaces that are adapted to store a set of instructions that is executable by the processor 402 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the second memory device 404 may be integrated with the processor 402 on a single chip, without departing from the scope of the disclosure.

The second communication interface 406 may correspond to a second communication interface 406 that may facilitate transmission and reception of messages and data to and from various devices. For example, the second communication interface 406 is communicatively coupled with a computing device (not shown). For example, through the second communication interface 406, the RFID printer 100 may be configured to receive commands/jobs from the computing device based on which the RFID printer 100 may perform predetermined operation. Examples of the second communication interface 406 may include, but are not limited to, an antenna, an Ethernet port, a USB port, a serial port, or any other port that can be adapted to receive and transmit data. The second communication interface 406 transmits and receives data and/or messages in accordance with the various communication protocols, such as, I2C, TCP/IP, UDP, and 2G, 3G, 4G or 5G communication protocols.

The I/O device interface unit 408 may include suitable logic and/or circuitry that may be configured to communicate with the one or more components of the RFID printer 100, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 408 may communicate with the media sensor 204, the first electrical drive, the second electrical drive, the third electrical drive, associated with the media hub 102, the RFID coupler 104, and the ribbon drive assembly 108 and the ribbon take-up hub 110, respectively, and the one or more buttons 136 provided the input panel 134 of the RFID printer 100. For example, the I/O device interface unit 408 may receive the input signal from the media sensor 204. Further, for example, the I/O device interface unit 408 may actuate the first electrical drive associated with the media hub 102 and the platen roller 202 to cause the media 116 to traverse along the media path 122. Some examples of the I/O device interface unit 408 may include, but not limited to, a Data Acquisition (DAQ) card, an electrical drives driver circuit, and/or the like.

Figure 6:
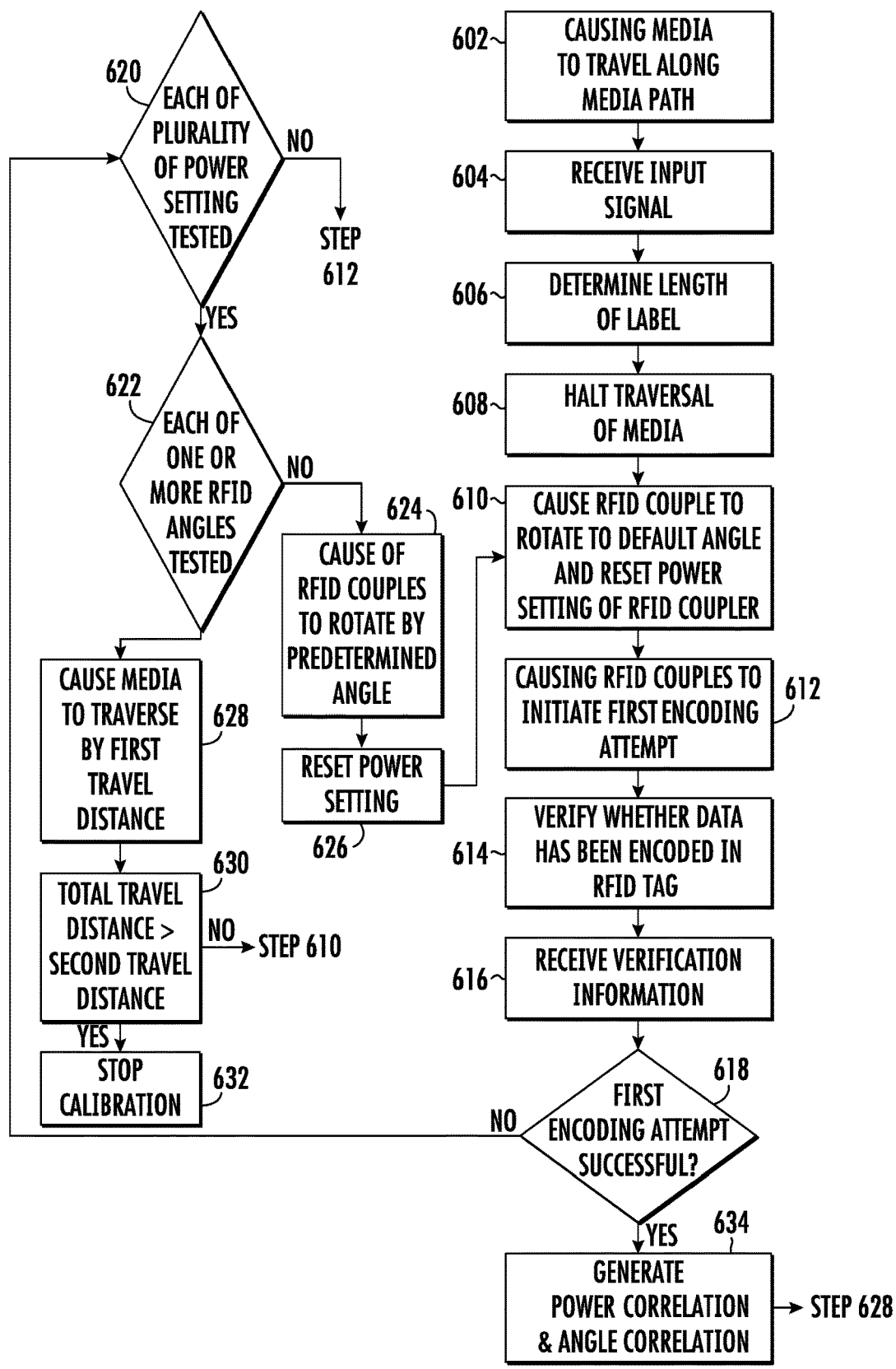
FIG. 6 illustrates a flowchart of a method for operating the RFID printer in a calibration mode, according to one or more embodiments described herein.
Figure 12:
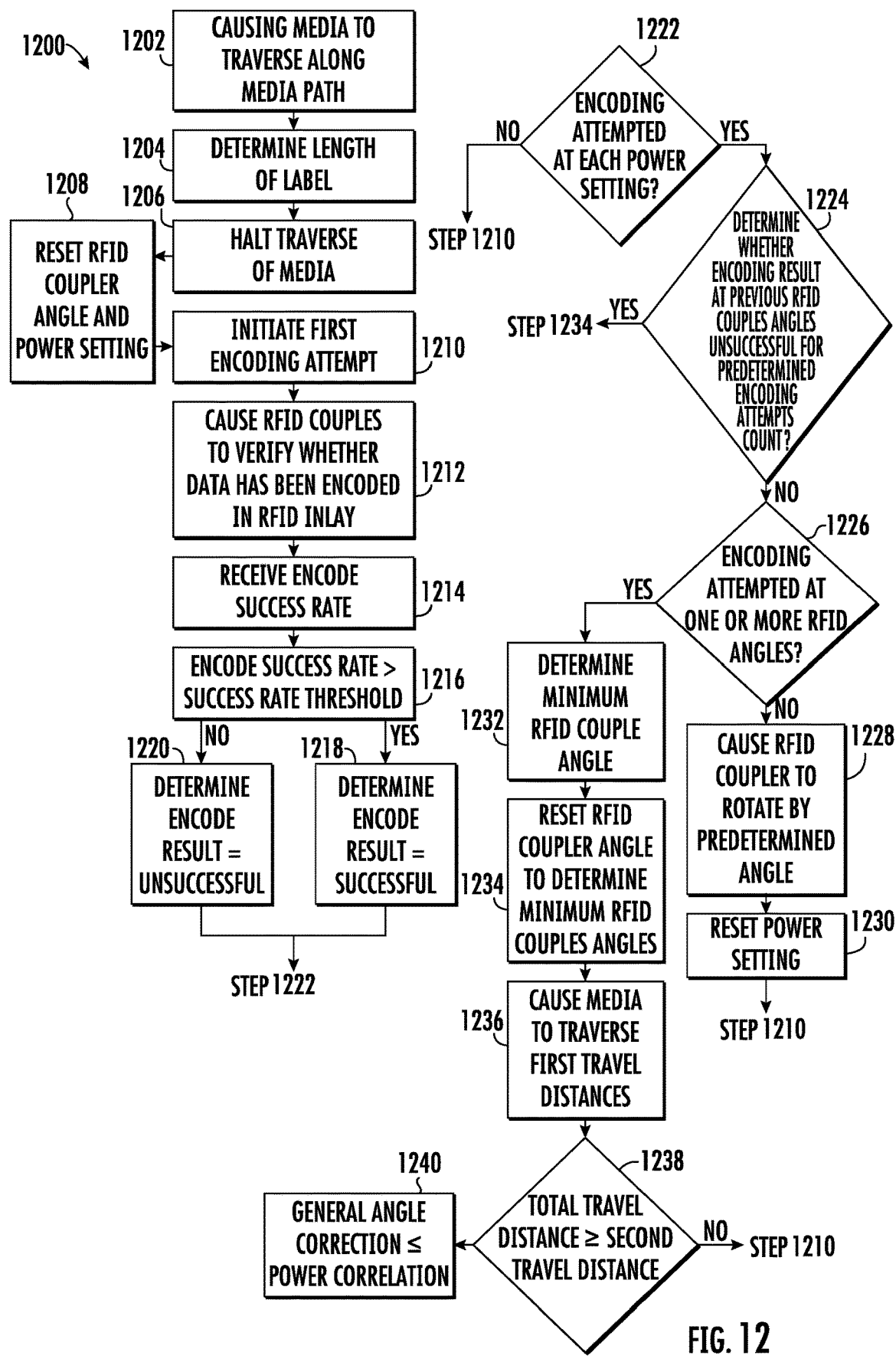
FIG. 12 illustrates a flowchart of another method for calibrating the RFID printer, according to one or more embodiments described herein.

The calibration unit 410 may include suitable logic and/or circuitry for calibrating the RFID printer 100, as further described in conjunction with FIGS. 6 and 12. In an example embodiment, the calibration unit 410 may be configured to determine one or more properties of the media 116. Some examples of the one or more properties of the media 116 may include, but are not limited to, a length of the plurality of labels 118, a type of the media 116, and/or the like. For the purpose of ongoing description, the calibration unit 410 determines the length of the plurality of labels 118 in the media 116, as further described in conjunction with FIG. 8. Further, the calibration unit 410 may be configured to determine an angle correlation between the angle of the RFID coupler 104 (the C-C' axis 209) with respect to the B-B' axis 208 and a position of the label 118a with respect to the media sensor 204, as further described in conjunction with FIGS. 6 and 13. In some example embodiments, the position of the label 118a may be defined as a distance of the start portion of the label 118a from the media sensor 204. Further, the calibration unit 410 may be configured to determine a power correlation between the plurality of power settings of the RFID coupler 104 and the angle of the RFID coupler 104, as further described in conjunction with FIGS. 6 and 13. The calibration unit 410 may be implemented using one or more hardware components, such as, but not limited to, FPGA, ASIC, and the like.

Figure 16:
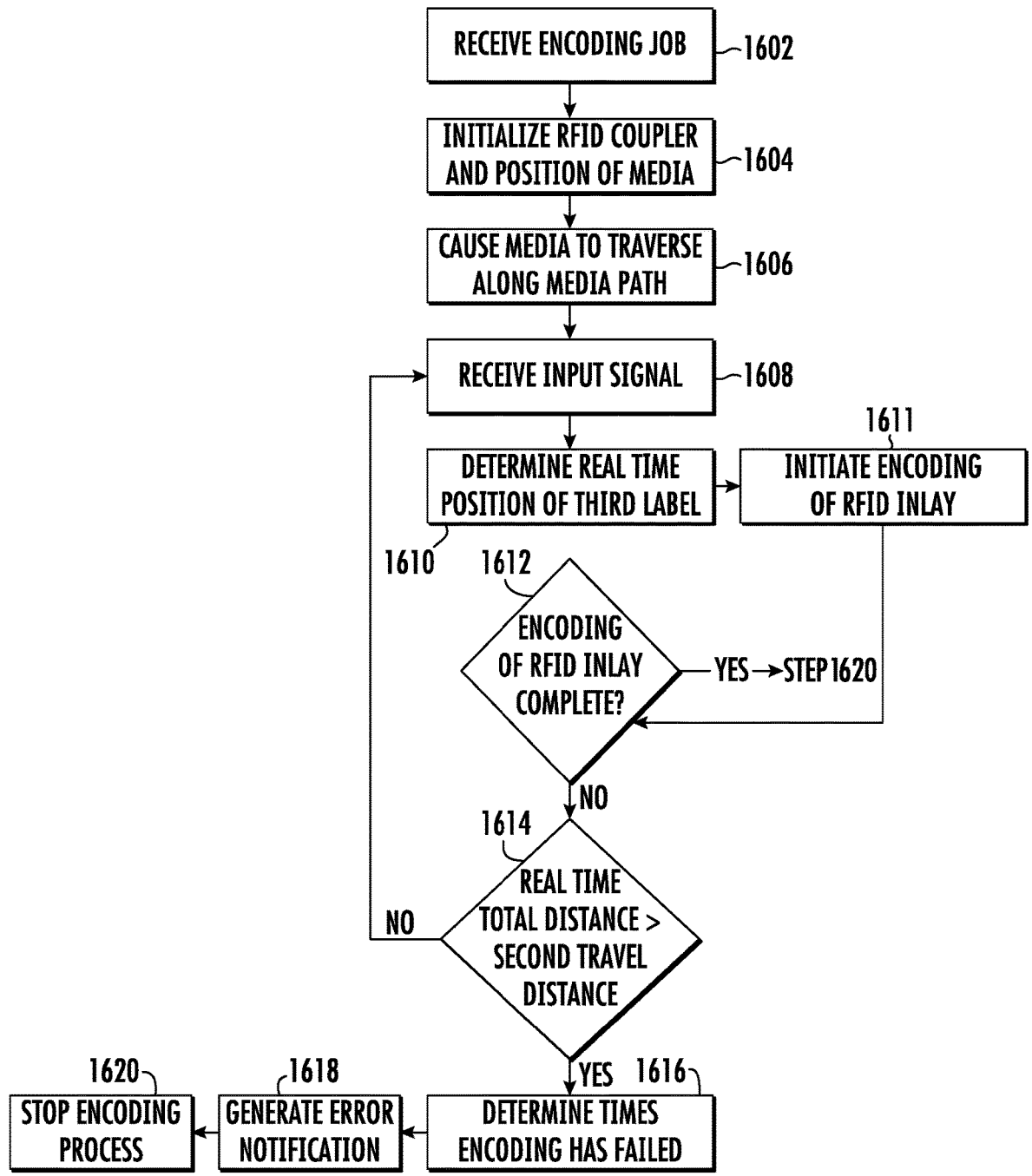
FIG. 16 illustrates a flowchart of a method for operating the RFID printer in an encoding mode, according to one or more embodiments described herein.

The encoding operation unit 412 may include suitable logic and/or circuitry for operating the RFID printer 100 in the encoding mode, as further described in conjunction with FIG. 16. In an example embodiment, the encoding operation unit 412 may be configured to cause the RFID encoder 308 in the RFID control system 105 to encode the RFID inlay 126 on the label 118a, through the RFID coupler 104, in accordance with the angle correlation and the power correlation, as further described in conjunction with FIG. 16. The encoding operation unit 412 may be implemented using one or more hardware components, such as, but not limited to, FPGA, ASIC, and the like.

The signal processing unit 414 may include suitable logic and/or circuitry for analyzing the input signal received from the media sensor 204. For example, the signal processing unit 414 may include a digital signal processor 402 that may be configured to identify the peaks and the valleys in the input signal. Further, the signal processing unit 414 may utilize one or more signal processing techniques such as, but not limited to, Fast Fourier Transform (FFT), Discrete Fourier Transform (DFT), Discrete Time Fourier Transform (DTFT) to analyze the input signal. The signal processing unit 414 may be implemented using one or more hardware components, such as, but not limited to, FPGA, ASIC, and the like.

In some examples the scope of the disclosure is not limited to having a separate control system 206 for the RFID printer 100. In an alternative embodiment, various units/modules of the control system 206 may be implemented on the RFID control system 105, forming an integrated, single apparatus, without departing from the scope of the disclosure. In another alternative embodiment, various functionalities of the RFID control system 105 may be implemented in the control system 206, forming an integrated, single apparatus, without departing from the scope of the disclosure. In such an implementation, the RFID coupler 104 may be directly communicatively coupled to the control system 206.

FIGS. 5, 6, 8, 9, 10, 12, 13, 16, and 17 illustrate example flowcharts of the operations performed by an apparatus, such as the RFID printer 100 of FIGS. 1A, 1B, and 1C, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5, 6, 8, 9, 10, 12, 13, 16, and 17, when executed, convert a computer or processing circuitry into a particular machine configured to perform an example embodiment of the present invention. Accordingly, the operations of FIGS. 5, 6, 8, 9, 10, 12, 13, 16, and 17 define algorithms for configuring one or more computers or processors to perform various example embodiments. In some cases, a general purpose computer may be provided with an instance of the processor which performs the algorithms of FIGS. 5, 6, 8, 9, 10, 12, 13, 16, and 17 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

Figure 5:
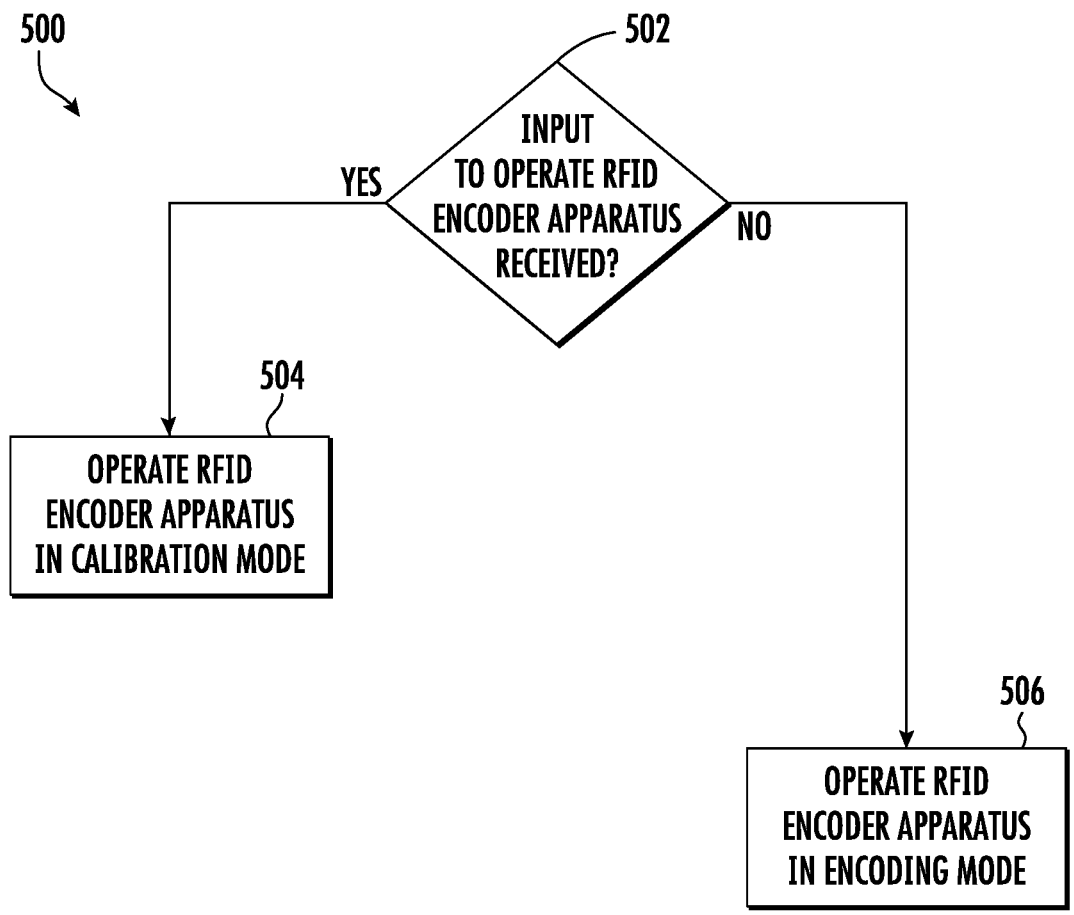
FIG. 5 illustrates an example flowchart for operating the RFID printer, according to one or more embodiments described herein.

FIG. 5 illustrates an example flowchart 500 for operating the RFID printer 100, according to the one or more embodiments described herein.

At step 502, the RFID printer 100 includes means, such as the control system 206, the processor 402, the calibration unit 410, and/or the like, for determining whether an input is received from the user of the RFID printer 100 to operate the RFID printer 100 in the calibration mode. In some embodiments, the user of the RFID printer 100 may provide the input (corresponding to operating the RFID printer 100 in the calibration mode) by pressing one or more buttons of the one or more buttons 136 provided on the input panel 134 of the RFID printer 100 in a predetermined pattern. In an example embodiment, the predetermined pattern may correspond to pressing the button (of the one or more buttons 136) in a predetermined sequence or for a predetermined time duration. For example, the user may keep the button (of the one or more buttons 136) pressed for 10 seconds. In some example embodiments, the predetermined pattern may be pre-configured during manufacturing of the RFID printer 100.

If the processor 402 determines that the input to operate the RFID printer 100 is received, the processor 402 may be configured to perform the step 504. At step 504, the RFID printer 100 includes means, such as the control system 206, the processor 402, the calibration unit 410, and/or the like, for operating the RFID printer 100 in the calibration mode. The operation of the RFID printer 100 in the calibration mode is further described in conjunction with FIG. 6.

FIG. 6 illustrates a flowchart 600 of a method for operating the RFID printer 100 in the calibration mode, according to one or more embodiments described herein.

At step 602, the RFID printer 100 includes means such as the control system 206, the processor 402, the calibration unit 410, the I/O device interface unit 408, and/or the like for causing the media to traverse/travel along the media path 122. In an example embodiment, the calibration unit 410 may be configured to instruct the I/O device interface unit 408 to actuate the first electrical drive associated with the media hub 102 and the platen roller 202. The actuation of the first electrical drive causes the media hub 102 and the platen roller 202 to rotate, which in turn causes the media roll 114 to supply the media 116 along the media path 122. Because the media 116 traverses along the media path 122, the media 116 also traverses with respect to the RFID coupler 104 and the media sensor 204.

In some examples, the I/O device interface unit 408 may be configured to actuate the first electrical drive at a predetermined angular velocity. In an example embodiment, actuating the first electrical drive at the predetermined angular velocity causes the media 116 to traverse along the media path 122 at a determined linear speed. In an example embodiment, the calibration unit 410 may be configured to store the predetermined angular velocity of the first electrical drive and the determined linear speed of the media 116 in the second memory device 404.

At step 604, the RFID printer 100 includes means, such as the control system 206, the processor 402, the calibration unit 410, the I/O device interface unit 408, and/or the like, for receiving the input signal from the media sensor 204 while the media 116 traverses along the media path 122. As discussed above, the input signal corresponds to the voltage signal that is representative of the transmissivity/reflectivity of the media 116. Further, as discussed above, the transmissivity/reflectivity of the media 116 is determined based on the intensity of the portion of the light signal reflected from the surface of the media 116 or transmitted through the media 116. Therefore, the input signal generated by the media sensor 204 is representative of the intensity of the portion of the light signal received by the media sensor 204. More specifically, the one or more characteristics of the input signal (such as the amplitude and frequency) of the input signal are representative of the intensity of the portion of the light signal received by the media sensor 204. For example, if the intensity of the portion of light signal received at a first time instant is greater than the intensity of the portion of the light signal received at a second time instant, the amplitude of the input signal received at the first time instant is greater than the intensity of the input signal received at the second time instant.

In an example embodiment, because the media is not stationary with respect to the media sensor 204 and different sections of the media 116 passes over the media sensor 204, the measure of the transmissivity/reflectivity varies as the media 116 traverses along the media path 122. Further, as discussed above, the media 116 has the plurality of labels 118 that are either separated by means of perforations 120 or by means of marks. When such marks/perforations 120 pass over the media sensor 204 while the media 116 traverses along the media path 122, the media sensor 204 may determine a sudden spike or sudden fall in the measure transmissivity/reflectivity of the media 116. Accordingly, the media sensor 204 generates the input signal that may be indicative of such variations in the measure of the transmissivity/reflectivity of the media 116. For example, variations in the one or more characteristics of the input signal (such as amplitude and frequency) may indicate such variations in the measure of the transmissivity/reflectivity of the media 116. One such example input signal is described in conjunction with FIG. 7.

Figure 7:
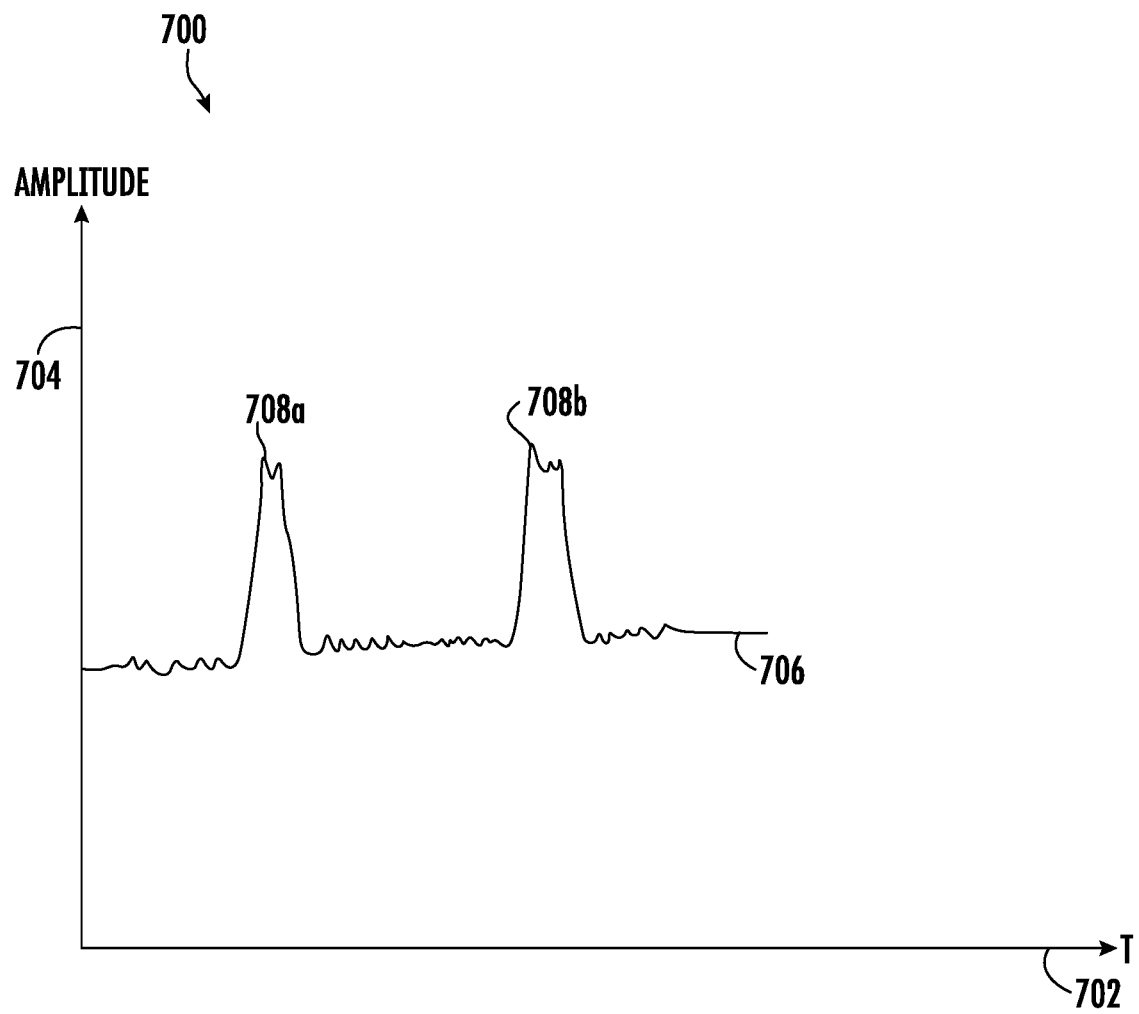
FIG. 7 illustrates a graphical representation of an example input signal, according to one or more embodiments described herein.

FIG. 7 illustrates a graphical representation 700 an example input signal, according to one or more embodiments described herein.

The graphical representation 700 includes an X-axis 702 and a Y-axis 704. The X-axis 702 represents the time duration for which the example input signal is received. The Y-axis 704 represents a measure of amplitude of the example input signal. The curve 706 represents the example input signal. The curve 706 includes various peaks such as 708a and 708b. The peak 708a and the peak 708b are chronologically spaced apart from each other. Further, the peaks 708a and 708b depict sudden increase in the measure of transmissivity/reflectivity of the media 116 as the media 116 traverses along the media path 122. As discussed, the sudden increase in the measure of transmissivity/reflectivity of the media 116 is due to passing of a perforation over the media sensor 204. Therefore, the peaks 708a and 708b may represent that a perforation may have passed over the media sensor 204 as the media 116 traverses along the media path 122.

Referring back to FIG. 6, at step 606, the RFID printer 100 includes means, such as the control system 206, the processor 402, the calibration unit 410, the signal processing unit 414, and/or the like, for determining length of the plurality of labels 118 in the media 116 based on the received input signal. The determination of the length of the plurality of labels 118 is further described in conjunction with FIG. 8.

Figure 8:
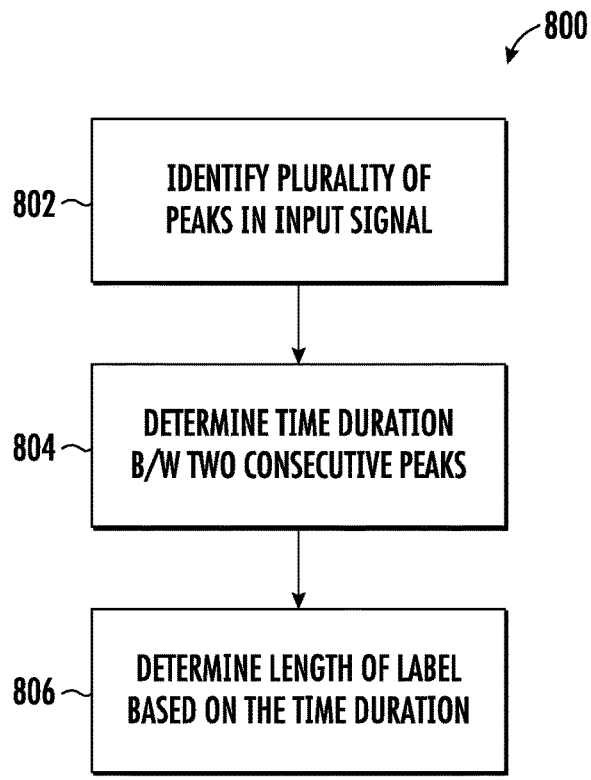
FIG. 8 illustrates a flowchart of a method for determining a length of a plurality of labels, according to one or more embodiments described herein.

FIG. 8 illustrates a flowchart 800 of a method for determining the length of the plurality of labels 118, according to the one or more embodiments described herein.

At step 802, the RFID printer 100 includes means such as the control system 206, the processor 402, the signal processing unit 414, and/or the like for identifying a plurality of peaks in the input signal (received in the step 604). In an example embodiment, the signal processing unit 414 may be configured to utilize one or more signal processing techniques to identify the plurality peaks in the received input signal. Some examples of the signal processing techniques that may be utilized to determine the plurality of peaks may include, but are not limited to, running averages, signal smoothening, wavelet transformation, and/or the like. As discussed above, the plurality of peaks in the input signal may be representative the sudden increase in the measure of transmissivity of the media 116. Further, as discussed above, the sudden increase in the measure of transmissivity of the media 116 indicates that the perforations 120 or a mark on the media 116 has passed over the media sensor 204 during the traversal of the media 116 along the media path 122. Therefore, the plurality of peaks in the input signal may be representative of the perforations 120/marks on the media 116.

At step 804, the RFID printer 100 includes means such as the control system 206, the processor 402, the signal processing unit 414, and/or the like for determining a time duration between two consecutive peaks in the input signal. As discussed above, the plurality of peaks represent the perforations 120 on the media 116. Further, as discussed above, a contiguous stretch of the media 116 between two consecutive perforations 120 corresponds to the label 118a in the media 116. Accordingly, the time duration between the two consecutive peaks may correspond to a time period that the label 118a took to pass the media sensor 204 during traversal of the media 116 along the media path 122.

At step 806, the RFID printer 100 includes means such as the control system 206, the processor 402, the calibration unit 410, and/or the like for determining the length of the label 118a based on the determined time duration between the two consecutive peaks and the determined linear speed of media traversal along the media path 122. As discussed above, the calibration unit 410 may be configured to determine the linear speed of media traversal based on the angular speed with which the calibration unit 410 causes the first electrical drive to rotate. For example, the calibration unit 410 may utilize the relationship between the angular velocity of the first electrical drive and the linear speed to determine the speed of media traversal.

After determining the linear speed of the media traversal, in an example embodiment, the calibration unit 410 may utilize the relationship between the speed and time to determine the length of the label 118a. Further, the calibration unit 410 may be configured to store the determined length of the label 118a in the second memory device 404.

In some example embodiments, the scope of the disclosure is not limited to determining the length of the label 118a, as is described in conjunction with FIG. 8. In an example embodiments, any other known method can be utilized to determine the length of the label 118a, without departing from the scope of the disclosure.

Referring back to the flowchart 600, at step 608, the RFID printer 100 includes means such as the control system 206, the processor 402, the calibration unit 410, I/O device interface unit 408, the signal processing unit 414, and/or the like for halting the traversal of the media 116. In an example embodiment, to halt the traversal of the media 116, the I/O device interface unit 408 may be configured to cause the first electrical drive to stop rotating, which in turn halts the traversal of the media 116 along the media path 122. In some examples, the I/O device interface unit 408 causes the media 116 to halt (by halting the rotation of the first electrical drive associated with the media hub 102 and the platen roller 202) in such a manner that a perforation 120 on the media 116 is positioned directly above the media sensor 204 (i.e., the perforation 120 aligns with the media sensor 204). In some example embodiments, the I/O device interface unit 408 may be configured to facilitate such halting of the media 116 (where the perforation 120 on the media 116 aligns with the media sensor 204) based on the input signal received from the media sensor 204. To facilitate such halting of the media 116, the signal processing unit 414 may be configured to monitor the one or more characteristics of the input signal received from the media sensor 204 while the media 116 traverses along the media path 122. In an instance in which the signal processing unit 414 identifies a peak in the input signal (by utilizing one or more signal processing techniques), the signal processing unit 414 may transmit an instruction to the I/O device interface unit 408 to halt the first electrical drive, which halts the media traversal along the media path 122. Further, because the media is halted upon identification of the peak in the input signal, the perforation 120 on the media 116 aligns with the media sensor 204.

In some examples, the scope of the disclosure is not limited to the media 116 being halted based on the identification of the peak in the input signal. In alternative example embodiments, the I/O device interface unit 408 halts the traversal of the media 116 based on the length of the label 118a (determined in the step 806) such that the perforation 120 on the media 116 aligns with the media sensor 204. For example, to halt the media 116, the signal processing unit 414 may monitor the input signal to determine whether a perforation 120 on the media 116 has passed over the media sensor 204 (based on identification of a peak in the input signal). In an instance in which the signal processing unit 414 determines that the perforation 120 on the media 116 has passed over the media sensor 204, the signal processing unit 414 may instruct the I/O device interface unit 408 to compare the distance traversed by the media 116 after the determination of the perforation 120 passing over the media sensor 204 with the length of the label 118a. In some examples, the I/O device interface unit 408 may be configured to determine the distance traversed by the media 116 based on the relation between the time and the linear speed with which the media 116 traverses along the media path 122. For instance, the I/O device interface unit 408 may determine a time elapsed since the signal processing unit 414 identified the peak in the input signal. Thereafter, based on the time elapsed and the linear speed of media traversal, the I/O device interface unit 408 may determine the distance traversed by the media 116 since the signal processing unit 414 identified the peak in the input signal. In an instance in which the distance traversed by the media 116 is equal to the length of the label 118a, the I/O device interface unit 408 may cause the first electrical drive to stop, which in turn leads to halting of the media 116. As discussed above, the length of the label corresponds to the contiguous stretch of the media 116 between two consecutive perforations 120. Further, as discussed above, the I/O device interface unit 408 halts the media 116 after the media 116 has traversed the distance which is equal to the length of the label 118a. Accordingly, when the media 116 is halted based on the length of the label 118a (as discussed above), the perforation 120 on the media 116 aligns with the media sensor 204 (i.e., the perforation 120 on the media 116 is positioned directly above the media sensor 204).

In some examples, when the media 116 is halted, the perforation 120 on the media 116 aligns with the media sensor 204. Further, as discussed, the perforation 120 separates two adjacent labels. Accordingly, when the media 116 is halted, a first label 118b (referring to FIG. 2) is positioned downstream of the media sensor 204 and a second label 118c (adjacent to the first label 118b) is positioned upstream of the media sensor 204.

At step 610, the RFID printer 100 includes means such as the control system 206, the processor 402, the calibration unit 410, I/O device interface unit 408, and/or the like for causing the RFID coupler 104 to rotate to a default angle and for resetting a power setting of the RFID coupler 104 to a default power setting. In some examples, the default angle of the RFID coupler 104 may correspond to 0 degrees angle between the axis C-C' 209 (passing through the RFID coupler 104) and the B-B' axis 208. To rotate the RFID coupler 104, in an example embodiment, the I/O device interface unit 408 may be configured to actuate the second electrical drive to cause the RFID coupler 104 to rotate to the default angle.

In an example embodiment, the default power setting of the RFID coupler 104 may correspond to a minimum power at which the RFID coupler 104 is capable of transmitting the data. In an example embodiment, to reset the power setting of the RFID coupler 104 to the default power setting, the calibration unit 410 may be configured to transmit an instruction to the RFID control system 105 that includes the information pertaining to resetting the power setting of the RFID coupler 104 to the default power setting.

At step 612, the RFID printer 100 includes means, such as the control system 206, the processor 402, the calibration unit 410, I/O device interface unit 408 and/or the like, for causing the RFID control system 105 to initiate encoding of the RFID inlay 126 on the second label (upstream of the media sensor 204) through the RFID coupler 104. The calibration unit 410 may be configured to transmit an instruction to the RFID control system 105 to initiate the first encoding attempt to encode the RFID inlay 126 on the second label 118c through the RFID coupler 104. In some examples, the instruction may include the data to be encoded. In some example embodiments, the instruction may include a power setting of the plurality of power settings at which the RFID coupler 104 is to be operated. As discussed, the power setting corresponds to the signal transmission power at which the data (to be encoded) is transmitted to the RFID inlay 126. An example instruction, transmitted to the RFID control system 105, is illustrated below:

TABLE 1

Instruction Format

| Header | Power setting | Data |
|---|---|---|

In an example embodiment, the header in the instruction includes information pertaining to protocols, frequency bands, and/or the like that the RFID control system 105 has to use in order to encode the RFID inlay 126 on the second label 118c through the RFID coupler 104. Additionally or alternately, the header may include error correction codes and error identification codes that may enable the RFID control system 105 to detect errors/correct errors in the received instruction. In some example embodiments, the power setting field in the instruction includes information pertaining to the power setting (hereinafter referred to as power setting information) at which the RFID coupler 104 has to be operated. In some examples, the power setting information in the instruction is represented in form of combination of bits. Each combination of bits represents a power setting. For instance, following table illustrates a mapping between the combination of bits and the plurality of power settings:

TABLE 2

Mapping between bits and the power settings

| Bits | Plurality of power settings |
|---|---|
| 00 | Power setting-1 (15 dbm) |
| 01 | Power setting-2 (17 dbm) |
| 10 | Power setting-3 (19 dbm) |
| 11 | Power setting-4 (21 dbm) |

For example, if the combination of the bits "01" is included in the instruction, the RFID coupler 104 is operated at the power setting-2, i.e., 17 dbm. In some examples, the "power setting-1" may correspond to the default power setting of the RFID coupler 104. The data field in the instruction is configured to hold the data to be encoded in the RFID inlay 126. In an example embodiment, the data may be formatted in accordance with EPC global formats or DOD formats. The encoding of the RFID inlay 126 is further described in conjunction with FIG. 9.

In some examples, the scope of the disclosure is not limited to the instruction having the format as illustrated in table 1. In alternative example embodiments, the instruction may include additional fields, without departing from the scope of the disclosure. In yet another embodiment, the instruction may not include the power setting field, without departing from the scope of the disclosure. For example, because the calibration unit 410 is configured to reset the power setting of the RFID coupler 104 to the default power setting prior to the RFID control system 105 initiating the first encoding attempt, the instruction sent to the RFID control system 105 to initiate the first encoding attempt may not include the power setting field.

Figure 9:
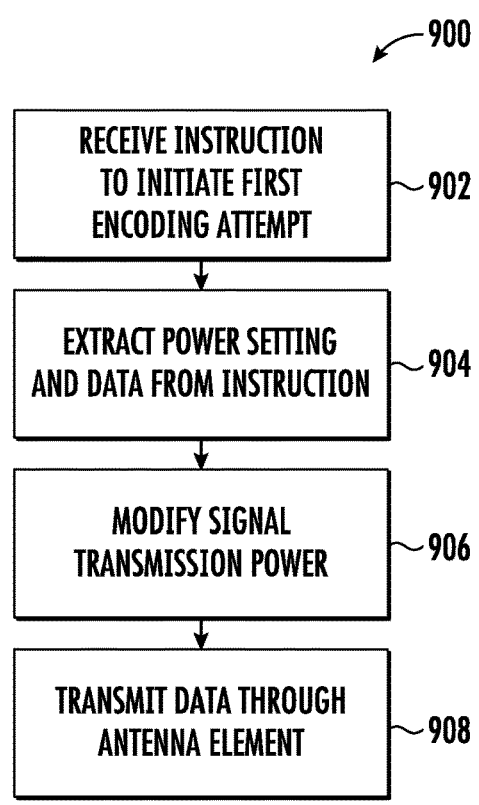
FIG. 9 illustrates a flowchart of a method for encoding an RFID inlay, according to one or more embodiments illustrated herein.

FIG. 9 illustrates a flowchart 900 of a method for encoding the RFID inlay 126, according to one or more embodiments illustrated herein.

At step 902, the RFID control system 105 includes means such as the controller 302, the first communication interface 306, and/or the like for receiving the instruction to initiate the first encoding attempt of the RFID inlay 126. As discussed above, the I/O device interface unit 408 in the control system 206 of the RFID printer 100 transmits the instruction to the RFID control system 105.

At step 904, the RFID control system 105 includes means such as the controller 302 and/or the like for decoding the received instruction to extract the power setting and the data to be encoded. The controller 302 may be configured to transmit the extracted power setting to the power modification unit 314. Further, the controller 302 may be configured to transmit the data (to be encoded) to the RFID encoder 308.

At step 906, the RFID control system 105 includes means, such as the controller 302, the power modification unit 314, and/or the like, for modifying the signal transmission power of the RFID coupler 104 based on the received power setting. The power modification unit 314 may be configured to determine the power setting at which the RFID coupler 104 is to be operated based on the received power setting information (received from the controller 302). As discussed, the power setting information corresponds to the combination of bits included in the instruction (received by the RFID control system 105). Further, as discussed, each of the combination of bits maps to a power setting of the plurality of power settings (as shown in table 2). For instance, if the combination of bits (corresponding to the power setting information) is "01", the power modification unit 314 may determine the power setting to be "power setting-2" i.e., 17 dbm. After determining the power setting, the power modification unit 314 may be configured to modify the signal transmission power of the RFID coupler 104 according to the determined power setting. For example, the power modification unit 314 may modify the signal transmission power of the RFID coupler 104 to 17 dbm (in an instance in which the power setting determined by the power modification unit 314 is "power setting-2"). In some examples, the power modification unit 314 may modify input voltage or input current applied to the RFID coupler 104 to modify the signal transmission power of the RFID coupler 104.

At step 908, the RFID control system 105 includes means, such as the controller 302, the RFID encoder 308, and/or the like, for transmitting the data (extracted from the instruction) through RFID coupler 104. In an example embodiment, the RFID encoder 308 may transmit the data using the RFID coupler 104 at the signal transmission power set by the power modification unit 314 in the step 906. Further, the RFID encoder 308 may transmit the data in accordance with protocols such as, but are not limited to, EPCglobal standards, DOD standards, and/or the like. Further, RFID encoder 308 may be configured to modulate the data (to be encoded) on RF carrier signals in either HF frequency band or in the UHF frequency band. In some examples, in addition to the data, the RFID encoder 308 may be configured to transmit a command that may instruct the RFID inlay 126 on the second label 118c to perform a predetermined operation with the data. For instance, the RFID encoder 308 may transmit the "Write" command along with the data to be encoded. On receiving the "Write" command, the RFID inlay 126 may store the data (accompanied with the command) in the corresponding memory, thereby encoding the RFID inlay 126.

Referring back to the flowchart 600, at step 614, the RFID printer 100 includes means, such as the control system 206, the processor 402, the calibration unit 410, the I/O device interface unit 408, and/or the like, for causing the RFID control system 105 to verify whether the data is encoded in the RFID inlay 126 on the second label 118c. In an example embodiment, the I/O device interface unit 408 may transmit the instruction to cause the RFID control system 105 to verify whether the data has been encoded in the RFID inlay 126. On receiving the instruction to verify whether the data is encoded in the RFID inlay 126, the RFID control system 105 may perform the verification operation. The verification operation performed by the RFID control system 105 is further described in conjunction with FIG. 10.

FIG. 10 illustrates a flowchart 1000 of a method for verifying whether the RFID inlay 126 has been encoded, according to one or more embodiments described herein.

At step 1002, the RFID control system 105 may include means, such as the controller 302, the RFID reader 310, the verification unit 312, and/or the like, for transmitting the interrogation command to the RFID inlay 126 in the second label 118c through the RFID coupler 104. Prior to transmitting the interrogation command, the RFID reader 310 may transmit RF signals to the RFID inlay 126 on the second label 118c through the RFID coupler 104. The RF signals may cause the RFID inlay 126 to induce charge and may accordingly use the induced charge to power itself (also referred to as power harvesting). Thereafter, RFID reader 310 may transmit the interrogation command to the RFID inlay 126 on the second label 118c. In some examples, the RF signals and the interrogation command are transmitted simultaneously. For example, the RFID reader 310 may modulate the interrogation command on the RF signal. In another example, the RFID reader 310 may be configured to utilize known standards such as, but not limited to, EPC global standards to transmit the interrogation command.

At step 1004, the RFID control system 105 may include means, such as the controller 302, the RFID reader 310, the verification unit 312, and/or the like, for determining whether the response to the interrogation command is received. If the RFID reader 310 determines that the response to the interrogation command is received through the RFID coupler 104, the verification unit 312 may be configured to perform the step 1006. However, if the response to the interrogation signal is not received, the verification unit 312 performs the step 1010.

At step 1006, the RFID control system 105 may means, such as the controller 302, the RFID reader 310, the verification unit 312, and/or the like, for determining whether the data received in the response to the interrogation command is same as the data which was transmitted to the RFID inlay 126 in the second label 118c (e.g., in the step 612). In an example embodiment, in an instance in which the verification unit 312 determines that the data received in response to the interrogation command is same as the data that was transmitted in the step 612, the verification unit 312 may be configured to perform the step 1008. However, if the verification unit 312 determines that the data received in response to the interrogation command is not the same as the data that was transmitted in the step 612, the verification unit 312 may be configured to perform the step 1010.

At step 1008, the RFID control system 105 may include means such as the controller 302, the RFID reader 310, the verification unit 312, and/or the like for transmitting a verification information to the control system 206 indicating that the encoding is successful.

At step 1010, the RFID control system 105 may include means such as the controller 302, the RFID reader 310, the verification unit 312, and/or the like for transmitting the verification information to the control system 206 indicating that the encoding is unsuccessful.

Referring back to FIG. 6, at step 616, the RFID printer 100 includes means such as the control system 206, the processor 402, the calibration unit 410, I/O device interface unit 408, and/or the like for receiving the verification information from the RFID control system 105. In an example embodiment, the verification information is deterministic of whether the first encoding attempt to encode of the RFID inlay 126 on the second label 118c is successful. At step 618, the RFID printer 100 includes means such as the control system 206, the processor 402, the calibration unit 410, and/or the like for determining whether the first encoding attempt to encode the RFID inlay 126 is successful based on the verification information (received from the RFID control system 105). Based on the verification information, the calibration unit 410 determines whether the first encoding attempt to encode the RFID inlay 126 is successful. If the calibration unit 410 determines that the first encoding attempt of the RFID inlay 126 is unsuccessful, the calibration unit 410 may perform the step 620.

At step 620, the RFID printer 100 includes means, such as the control system 206, the processor 402, the calibration unit 410, and/or the like, for determining whether the RFID control system 105 has attempted to encode the RFID inlay 126 in the second label 118c at each of the plurality of power settings (e.g., the power settings mentioned in the table 2), while the start portion of the second label 118c is aligned with the media sensor 204. As discussed above, during the first encoding attempt, the RFID control system 105 attempts to encode the RFID inlay 126 on the second label 118c (through the RFID coupler 104) at the default power settings (e.g., the power setting-1). Accordingly, the calibration unit 410 determines whether the RFID control system 105 has attempted to encode the RFID inlay 126 (through the RFID coupler 104) at each of the other power settings of the plurality of power settings other than the default power settings. If the calibration unit 410 determines that the RFID control system 105 has not attempted to encode the RFID inlay 126 at each of the plurality of power settings, while the start portion of the second label 118c is aligned with the media sensor 204, the calibration unit 410 may be configured to repeat the step 612 to cause the RFID control system 105 to initiate another encoding attempt to encode the RFID inlay 126 at a different power setting than the default power setting (i.e., the power setting used in the first encoding attempt). For instance, the RFID control system 105 may operate the RFID coupler 104 at a different power setting and accordingly attempt to attempt to encode the RFID inlay 126 at the different power setting.

However, if at step 620, the calibration unit 410 determines that the RFID control system 105 has attempted to encode the RFID inlay 126 at each of the plurality of power settings, the calibration unit 410 may be configured to perform the step 622. At step 622, the RFID printer 100 includes means, such as the control system 206, the processor 402, the calibration unit 410, and/or the like, for determining whether the RFID control system 105 has attempted to encode the RFID inlay 126 at each of the one or more RFID coupler angles within the RFID coupler angle range. As discussed, the RFID coupler angle range corresponds to a range of RFID coupler angle within which the RFID coupler 104 is rotatable. In some examples, the one or more RFID coupler angles may correspond to a step size of the second electrical drive coupled to the RFID coupler 104. In an example embodiment, the step size of the electrical drive corresponds to a minimum angle by which the second electrical drive is rotatable. For example, if the step size of the second electrical drive is 5 degrees, the one or more RFID coupler angles will include 5 degrees, 10 degrees, 15 degrees, and so forth.

If the calibration unit 410 determines that the RFID control system 105 has not attempted to encode the RFID inlay at each of the one or more RFID coupler angles, the calibration unit 410 may be configured to perform the step 624. At step 624, the RFID printer 100 includes means, such as the control system 206, the processor 402, the calibration unit 410, I/O device interface unit 408, and/or the like, for causing the RFID coupler 104 to rotate by a predetermined angle. In an example embodiment, the I/O device interface unit 408 may be configured to actuate the second electrical drive in order to rotate the RFID coupler 104 by the predetermined angle. In some examples, the predetermined angle may correspond to a multiple of the step size of the second electrical drive. For example, the I/O device interface unit 408 may actuate the second electrical drive to cause the RFID coupler 104 to rotate by 10 degrees (where the step size of the second electrical drive is 5 degrees). In another example, the predetermined angle may correspond to the step size of the second electrical drive. For example, if the step size of the second electrical drive is 5 degrees, the I/O device interface unit 408 may cause the RFID coupler 104 to rotate by 5 degrees. Thereafter, the calibration unit 410 may be configured to perform the step 626. At step 626, the RFID printer 100 includes means, such as the control system 206, the processor 402, the calibration unit 410, I/O device interface unit 408, and/or the like for resetting the power setting of the RFID coupler 104 to the default power setting, as described in the step 610. For example, the calibration unit may transmit an instruction to the RFID control system 105 to reset the power setting of the RFID coupler 104 to the default power setting. Thereafter, the calibration unit 410 may be configured to repeat the step 612 to cause the RFID control system 105 to initiate another encoding attempt to encode the RFID inlay 126 when the RFID coupler 104 is tilted by the predetermined angle (i.e., the RFID coupler angle is equal to the predetermined angle).

If at step 622, the calibration unit 410 determines that the RFID control system 105 has attempted to encode the RFID inlay 126 in the second label 118c at each of the one or more RFID coupler angles, the calibration unit 410 may be configured to perform the step 628.

At step 628, the RFID printer 100 includes means, such as the control system 206, the processor 402, the calibration unit 410, I/O device interface unit 408 and/or the like, for causing the media 116 to traverse along the media path 122 by a first travel distance. In an example embodiment, the I/O device interface unit 408 may be configured to actuate the first electrical drive to cause the media 116 to traverse along the media path 122 by the first travel distance. In some examples, the first travel distance corresponds to a linear distance traversed by the media 116 along the media path 122. As discussed above, the processor 402 determines the relation between the angular velocity of the first electrical drive and the linear speed by which the media 116 will traverse along the media path 122 when the first electrical drive is actuated. Therefore, based on the relation between the linear speed of the media 116 and the angular velocity of the first electrical drive, the I/O device interface unit 408 may be configured to actuate the first electrical drive to cause the media to traverse along the media path 122 by the first travel distance. For example, the I/O device interface unit 408 may actuate the first electrical drive to cause the media 116 to travel along the media path 122 by 1 mm. In an example embodiment, when the media 116 traverses along the media path 122 by the first travel distance, the position of the second label 118c with respect to the media sensor 204 modifies. For example, the second label 118c also travels downstream towards the print head 112 by 1 mm. Further, after the traversal of the media 116, the start portion of the second label 118c no longer aligns with the media sensor 204. To this end, the position of the start portion of the second label 118c is 1 mm downstream of the media sensor 204.

At step 630, the RFID printer 100 includes means, such as the control system 206, the processor 402, the calibration unit 410, I/O device interface unit 408, and/or the like, for determining whether a total distance traversed by the media 116 is greater than equal to a second travel distance. In some examples, the second travel distance may be 1.5 times the length of the label. For example, if the length of the label is 10 mm, the second travel distance is 15 mm.

In an example embodiment, the total distance traversed by the media 116 corresponds to a distance travelled by the media 116 from the position where the perforation 120 on the media 116 aligns with the media sensor 204 (e.g., the start portion of the second label 118c aligns with the media sensor 204). For example, after multiple iterations of the step 628, the calibration unit 410 determines that the media 116 has traversed along the media path 122 by 5 mm from the position where the media was initially halted (i.e., the position where the perforation 120 aligns with the media sensor 204), the total distance traversed by the media 116 is 5 mm. In an example embodiment, the calibration unit 410 may be configured to determine the total distance traversed by the media 116 by determining a count of times the step 628 has been performed. For example, the calibration unit 410 has performed the step 628 five times, i.e., the media 116 has been traversed by first travel distance five times. Accordingly, the total travel distance of the media 116 is five times the first travel distance.

In an example embodiment, if the calibration unit 410 determines that the total distance traversed by the media 116 along the media path 122 is equal to or greater than the second travel distance, the calibration unit 410 may be configured to perform the step 632. However, if the calibration unit 410 determines that the total distance traversed by the media 116 is less than the second travel distance, the calibration unit 410 may be configured to repeat the step 610.

At step 632, the RFID printer 100 includes means, such as the control system 206, the processor 402, the calibration unit 410, the I/O device interface unit 408, and/or the like, for stopping the calibration of the RFID printer 100.

If at step 618, the calibration unit 410 determines that the encoding of the RFID inlay is successful, the calibration unit 410 may be configured to perform the step 634. At step 634, the RFID printer 100 includes means, such as the control system 206, the processor 402, the calibration unit 410, and/or the like, for generating the power correlation and the angle correlation. In an example embodiment, the angle correlation corresponds to a mapping between the position of the second label (e.g., the distance of the start portion of the second label 118c from the media sensor 204) and the RFID coupler angle at which the encoding of the RFID inlay 126 on the second label 118c is successful. In an example embodiment, the power correlation corresponds to a mapping between the power setting at which the encoding of the RFID inlay 126 is successful, and the RFID coupler angle at which the encoding of the RFID inlay 126 on the second label 118c is successful.

As discussed above, during the calibration of the RFID printer 100, the traversal of the media 116 is halted in such a manner that the perforation 120 separating the first label 118b and the second label 118c aligns with the media sensor 204. In other words, initially, the start portion of the second label 118c (i.e., the perforation 120) is aligned with the media sensor 204. Thereafter, the RFID control system 105 attempts to encode the RFID inlay 126 on the second label 118c through the RFID coupler 104. Because the position of the RFID inlay 126 on the second label 118c is unknown, the calibration unit 410 attempts to encode the RFID inlay 126 at the one or more RFID coupler angles (within the RFID coupler angle range) and the plurality of RFID power settings (as described in the steps 620-626). By attempting the encoding of the RFID inlay 126 at the one or more RFID coupler angles and the plurality of power settings, the calibration unit 410 is able to determine an RFID coupler angle of the one or more RFID coupler angles and a power setting at which the encoding of the RFID inlay 126 is successful, when the start portion (i.e., the perforation 120) of the second label 118c is aligned with the media sensor 204. On the determination that the RFID inlay 126 on the second label 118c has been successfully encoded, the calibration unit 410 creates a look-up table that includes the position of the second label 118c (i.e., the distance of the start portion of the second label 118c from the media sensor 204) and the corresponding RFID coupler angle and the power setting at which the encoding of the RFID inlay 126 is successful.

Similarly, the calibration unit 410 determines the RFID coupler angle and the power setting at which the encoding of the RFID inlay is successful, when the media is traversed by the first travel distance. In some examples, when the media is traversed by the first travel distance (e.g., 1 mm), the position of the RFID inlay 126 on the second label 118c gets modified (i.e., the RFID inlay 126 on the second label 118c also traverses along the media path 122 by 1 mm). Therefore, in some examples, the RFID coupler angle and the power setting determined for when the media 116 is traversed by 1 mm may be different from the RFID coupler angle and the power setting determined for when the start portion of the second label 118c is aligned with the media sensor 204. Accordingly, the calibration unit 410 may be configured to store the values of the RFID coupler angle and the power setting in the look-up table for each position of the second label 118c. Following table illustrates an example look-up table:

TABLE 3 illustrating the angle correlation and the power correlation

| Position of the second label | Power setting | RFID coupler angle |
|---|---|---|
| 0 mm (start portion of the second label aligns with the media sensor) | Power setting-1 | 0 degrees |
| 1 mm | Power setting-1 | 10 degrees |
| 2 mm | Power setting-2 | 10 degrees |
| 3 mm | Power setting-3 | 15 degrees |

From table 3, it can be observed that, when position of the second label 118c is 1 mm from the media sensor 204, the RFID control system 105 was able to successfully encode the RFID inlay 126 at RFID coupler angle of 10 degrees and at the power setting-1. Similarly, when position of the second label 118c from the media sensor 204 is 2 mm, the RFID control system 105 was able to successfully encode the RFID inlay 126 at RFID coupler angle of 10 degrees and at the power setting-2. After the generation of the angle correlation and the power correlation for the current position of the second label, the calibration unit 410 may be configured to repeat the step 628.

Figure 11:
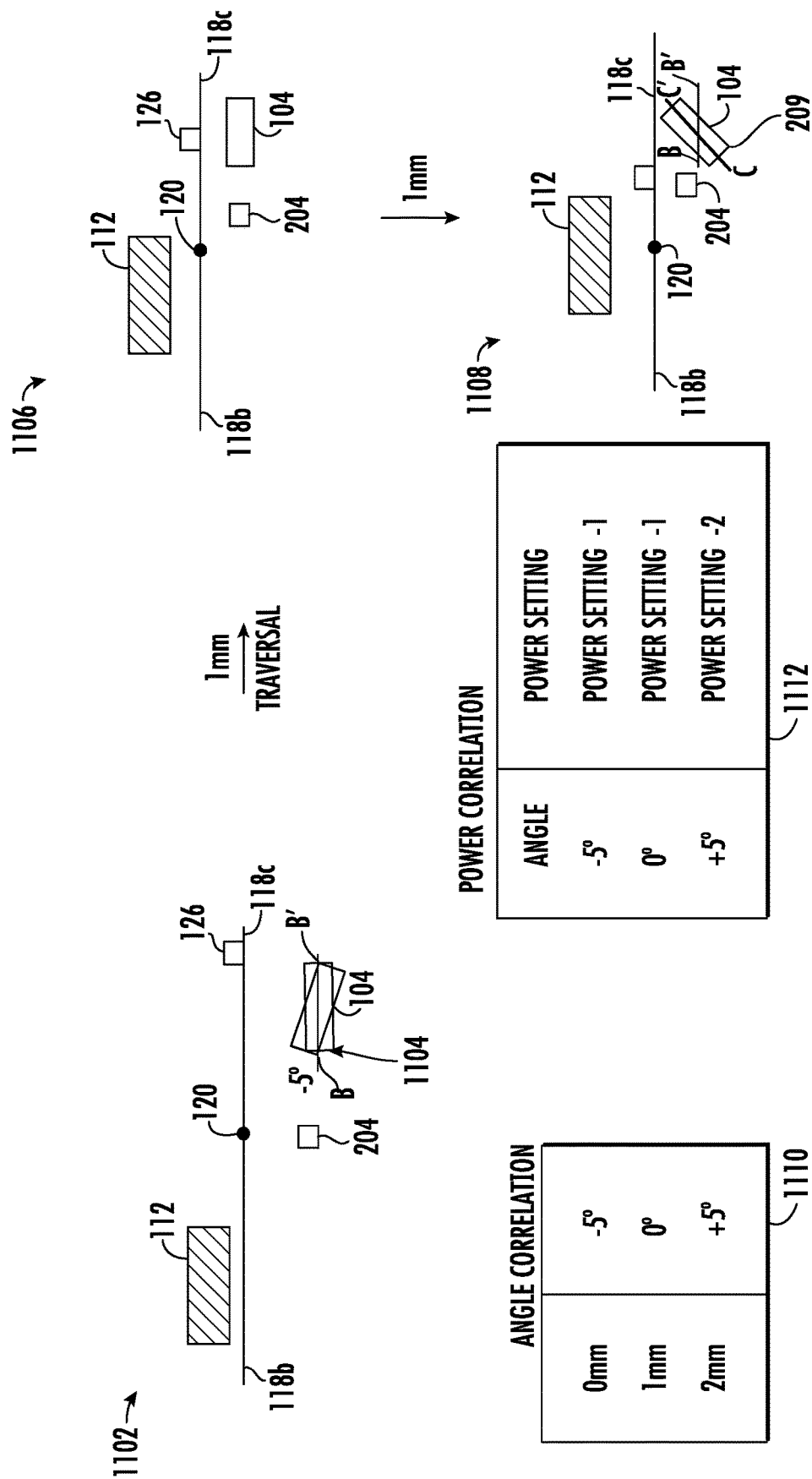
FIG. 11 illustrates an example calibration flow of the RFID printer, according to one or more embodiments described herein.

FIG. 11 illustrates an example calibration flow 1100 of the RFID printer 100, according to one or more embodiments described herein. FIG. 11 illustrates a series of schematic diagrams of the RFID printer 100 illustrating various iterations performed by the calibration unit 410 during the calibration of the RFID printer 100.

The schematic diagram 1102 illustrates that the perforation 120 is aligned with the media sensor 204. Further, the schematic diagram 1102 illustrates that the first label 118b is below the print head 112. Further, the second label 118c is positioned upstream of the first label 118b and is proximal to the RFID coupler 104. The RFID inlay 126 on the second label 118c is further positioned upstream from the position of the RFID coupler 104. It can be observed from the schematic diagram 1102 that the RFID coupler angle is −5 degrees (e.g., 1104) ("−" sign represents that the RFID coupler 104 has been rotated in the clockwise direction from the default angle of zero degrees). In some examples, the RFID inlay 126 is successfully encoded at the RFID coupler angle of the −5 degrees (e.g., 1104). After successful encoding the RFID inlay 126 on the second label 118c, the calibration unit 410 causes the media 116 to traverse by 1 mm (i.e., the first travel distance), as illustrated by the schematic diagram 1106.

The schematic diagram 1106 illustrates that the perforation 120 has moved along the media path 122 by 1 mm. Similarly, the RFID inlay 126 on the second label 118c has moved along the media path 122 by 1 mm. Further, after the movement/traversal of the media 116 by 1 mm along the media path 122, the RFID inlay 126, as depicted in the schematic diagram 1106, is aligned with the RFID coupler 104. Accordingly, the RFID control system 105 successfully encodes the RFID inlay 126, when the RFID coupler angle is zero degrees.

Similarly, the schematic diagram 1106 represents the RFID printer 100 when total distance traversed by the media 116 is 2 mm (i.e., the media 116 is traversed by the 1 mm from the position illustrated in the schematic diagram 1104), to encode the RFID inlay 126 on the second label 118c, the calibration unit 410 has caused the RFID coupler 104 to rotate by +5 degrees (e.g., 1108). Therefore, the RFID coupler angle is +5 degrees. The aforementioned process is repeated until the total distance traversed by the media 116 is 1.5 times the length of the label (determined in the step 606).

In some examples, it may be understood that the calibration unit 410 may be configured to use the methodologies described in the flowchart 600 to attempt encoding of the RFID inlay 126. For example, the calibration unit 410 may cause the RFID control system 105 to attempt encoding of the RFID inlay 126 at various power settings at each RFID coupler angle (as is described in the flowchart 600). Therefore, after attempting encoding of the RFID inlay 126 at each of the one or more RFID coupler angles, the calibration unit 410 may be configured to generate the angle correlation (e.g., depicted by the table 1110) and the power correlation (e.g., depicted by table 1112). In some examples, the scope of the disclosure is not limited to having two separate tables to represent the angle correlation and the power correlation. In an example embodiment, the angle correlation and the power correlation may be represented in a single look-up table, as illustrated above in the table 3.

In some example embodiments, the scope of the disclosure is not limited to calibrating the RFID printer 100 in accordance with the method illustrated in the flowchart 600. In an example embodiment, the RFID printer may be calibrated in accordance with a method illustrated in FIG. 12.

FIG. 12 illustrates a flowchart 1200 of another method for calibrating the RFID printer 100, according to one or more embodiments described herein.

At step 1202, the RFID printer 100 includes means, such as the control system 206, the processor 402, the calibration unit 410, I/O device interface unit 408, and/or the like, for causing the media 116 to traverse along the media path 122. In an example embodiment, the I/O device interface unit 408 may actuate the first electrical drive to cause the media 116 to traverse along the media path 122.

At step 1204, the RFID printer 100 includes means, such as the control system 206, the processor 402, the calibration unit 410, the I/O device interface unit 408, the signal processing unit 414 and/or the like, for determining the length of the plurality of labels 118. In an example embodiment, the signal processing unit 414 may be configured to determine the length of the label in a similar manner as described above in the step 606. For example, the signal processing unit 414 may be configured to receive the input signal from the media sensor 204 through the I/O device interface unit 408. The input signal may include the plurality of peaks (e.g., the peaks 708a and 708b). In an example embodiment, the signal processing unit 414 may be configured to identify the plurality of peaks in the input signal using the one or more signal processing techniques. Thereafter, the signal processing unit 414 may be configured to determine the time duration between the two consecutive peaks in the input signal. Based on the determined time duration between the two consecutive peaks and the linear speed of traversal of the media 116 along the media path 122 (determined based on the angular velocity of the first electrical drive), the calibration unit 410 may be configured to determine the length of the plurality of labels 118.

At step 1206, the RFID printer 100 includes means, such as the control system 206, the processor 402, the calibration unit 410, I/O device interface unit 408, and/or the like, for halting the traversal of the media 116 along the media path 122 in such a manner that the perforation 120 on the media 116 aligns with the media sensor 204. In an example embodiment, the I/O device interface unit 408 may be configured to cause the media 116 to halt when the signal processing unit 414 detects a peak in the input signal, as described in the step 608. In alternative example embodiment, the I/O device interface unit 408 may cause the media 116 to halt based on the length of the label, as described above in the step 608.

At step 1208, the RFID printer 100 includes means, such as the control system 206, the processor 402, the calibration unit 410, I/O device interface unit 408, and/or the like, for resetting the RFID coupler angle to the default angle and for resetting the power setting of the RFID coupler 104 to the default power setting. As discussed above, the default angle is zero degrees angle between the C-C' axis 209 and the B-B' axis 208. Further, as discussed above, the default power setting of the RFID coupler 104 corresponds to the minimum power at which the data is transmittable from the RFID coupler 104. For example, the default power setting of the RFID coupler 104 is the power setting-1 (refer table 2).

In an example embodiment, the I/O device interface unit 408 may be configured to actuate the second electrical drive to cause the RFID coupler 104 to rotate to a position where the angle between the C-C' axis 209 and the B-B' axis 208 is zero degrees. Further, to reset the power of the RFID coupler 104 to the default power setting, the calibration unit 410 may be configured to transmit an instruction to the RFID control system 105 that includes the power setting at which the RFID coupler 104 has to be operate. For example, the instruction may include the combination of the bits corresponding to the "power setting-1" (which is "00"). On receiving the combination of bits from the calibration unit 410, the power modification unit 314 in the RFID control system 105 may modify the power at which the RFID coupler 104 operates.

At step 1210, the RFID printer 100 includes means, such as the control system 206, the processor 402, the calibration unit 410, the I/O device interface unit 408 and/or the like, for causing the RFID control system 105 to initiate an encoding attempt to encode the RFID inlay 126 on the second label 118c. In an example embodiment, the calibration unit 410 may perform similar methodology, as described in the step 612 to initiate the first encoding attempt to encode the RFID inlay 126. For example, the calibration unit 410 may transmit the instruction to encode the RFID inlay 126 to the RFID control system 105. As discussed above, the instruction includes the header, the power setting at which the RFID coupler 104 has to be operated, and the data to be encoded in the RFID inlay 126 on the second label 118c.

On receiving the instruction, the controller 302 in the RFID control system 105 may be configured to extract the power setting information and the data from the instruction. Further, the controller 302 may be configured to transmit the power setting information to the power modification unit 314. Furthermore, the controller 302 may transmit the extracted data to the RFID encoder 308.

On receiving the power setting information from the controller 302, the power modification unit 314 may be configured to modify the signal transmission power of the RFID coupler 104 in accordance with the received power setting information. After the signal transmission power of the RFID coupler 104 is modified, the RFID encoder 308 may be configured to transmit the data (extracted from the instruction) to the RFID inlay 126 in the second label 118c.

At step 1212, the RFID printer 100 includes means, such as the control system 206, the processor 402, the calibration unit 410, the I/O device interface unit 408 and/or the like, for causing the RFID control system 105 to verify whether the data has been successfully encoded in the RFID inlay 126 on the second label 118c. The verification process is further described in conjunction with FIG. 13.

FIG. 13 illustrates a flowchart 1300 of a method for verifying whether the data has been encoded in the RFID inlay 126 of the second label 118c, according to one or more embodiments described herein.

At step 1302, the RFID control system 105 may include means, such as the controller 302, the RFID reader 310, the verification unit 312, and/or the like, for initializing a total encode counter and a successful encode counter. In an example embodiment, the successful encode counter may be deterministic of a count of times the RFID encoder 308 in the RFID control system 105 has successfully encoded data in the RFID inlay 126. To determine whether the RFID encoder 308 has successfully encoded the RFID inlay 126, the RFID reader 310 may attempt to read the RFID inlay 126 immediately after the RFID encoder 308 has attempted to encode the RFID inlay 126, as is described in the step 1304. In an example embodiment, the total encode counter may correspond to a count of times the RFID encoder 308 has attempted to encode the RFID inlay 126 on the second label 118c, while the RFID coupler angle and the power setting associated with the RFID coupler 104 remain constant.

At step 1304, the RFID control system 105 may include means, such as the controller 302, the RFID reader 310, the verification unit 312, and/or the like, for transmitting the interrogation command to the RFID inlay 126 in the second label 118c through the RFID coupler 104. As discussed above, prior to transmitting the interrogation command, the RFID reader 310 may transmit the RF signals to the RFID inlay 126 on the second label 118c through the RFID coupler 104. The RFID inlay 126 may harvest power from the RF signals to power itself. Thereafter, RFID reader 310 may transmit the interrogation command to the RFID inlay 126 on the second label 118c through the RFID coupler 104.

At step 1306, the RFID control system 105 may include means, such as the controller 302, the RFID reader 310, the verification unit 312, and/or the like, for determining whether the response to the interrogation command is received. In an example embodiment, if the response to the interrogation signal is not received, the verification unit 312 may be configured to perform the step 1312. However, if the response to the interrogation command is received, the verification unit 312 may be configured to perform the step 1308. In an example embodiment, the response to the interrogation command may include the data that was encoded in the RFID inlay 126 in the step 1210.

At step 1308, the RFID control system 105 may include means, such as the controller 302, the RFID reader 310, the verification unit 312, and/or the like, for determining whether the data received in the response to the interrogation signal is same as the data that was transmitted to the RFID inlay 126 in the second label 118c (e.g., in step 1210). In an example embodiment, in an instance in which the verification unit 312 determines that the data received in response to the interrogation command is same as the data that was transmitted in the step 1210, the verification unit 312 may be configured to perform the step 1310. At step 1310, the RFID control system 105 may include means, such as the controller 302, the RFID reader 310, the verification unit 312, and/or the like, for incrementing the successful encode counter and the total encode counter. In an example embodiment, incrementing of the successful encoder counter depicts that the encoding of the RFID inlay 126 is successful.

If, at step 1308, the verification unit 312 determines that the data received in response to the interrogation command is not same as the data that was transmitted in the step 1210, the verification unit 312 may be configured to perform the step 1312. At step 1312, the RFID control system 105 may include means, such as the controller 302, the RFID reader 310, the verification unit 312, and/or the like, for incrementing the total encode counter. In an example embodiment, only incrementing the total encode counter may depict that attempt to encode the RFID inlay 126 is unsuccessful.

At step 1314, the RFID control system 105 may include means, such as the controller 302, the RFID reader 310, the verification unit 312, and/or the like, for determining whether the total encode counter is equal to or greater than a total encode counter threshold. In an example embodiment, the total encode counter threshold may correspond to a maximum count of times the RFID encoder 308 may attempt to encode the RFID inlay 126, while the RFID coupler angle and the power setting associated with the RFID coupler 104 remain constant. In some examples, the total encode counter threshold may be pre-programmed in the RFID printer 100 at the time of manufacturing of the RFID printer 100.

If, at step 1314, the verification unit 312 determines that the total encode counter is less than the total encode counter threshold, the verification unit 312 may be configured to repeat the step 1210 without changing the RFID coupler angle and the power setting at which the RFID coupler 104 is operating. However, if, at step 1314, the verification unit 312 determines that the total encode counter is equal to or has exceeded the total encode counter threshold, the verification unit 312 may be configured to perform the step 1316.

At step 1316, the RFID control system 105 may include means, such as the controller 302, the RFID reader 310, the verification unit 312, and/or the like, for determining an encode success rate. In an example embodiment, the encode success rate may correspond to a percentage of times the data has been successfully read (i.e., the successful encode counter) over the count of times the RFID encoder 308 has attempted to encode the RFID inlay 126. Following equation depicts the encode success rate:

$$\text{encode sucess rate} = \frac{\text{sucessful encode counter}}{\text{total encode counter}} \times 100 \qquad (1)$$

At step 1318, the RFID control system 105 may include means, such as the controller 302, the RFID reader 310, the verification unit 312, the first communication interface 306, and/or the like, for transmitting the determined encode success rate to the control system 206.

Referring back to FIG. 12, at step 1214, the RFID printer 100 includes means such as the control system 206, the processor 402, the calibration unit 410, the I/O device interface unit 408 and/or the like, for receiving the encode success rate from the RFID control system 105. Further, the calibration unit 410 may be configured to store the received encode success rate in the second memory device 404.

Thereafter, at step 1216, the RFID printer 100 includes means, such as the control system 206, the processor 402, the calibration unit 410, and/or the like, for determining whether the received encode success rate is greater than a success rate threshold. In an example embodiment, the success rate threshold may correspond to a value of the encode success rate beyond which the calibration unit 410 may determine that the first encoding attempt of the RFID inlay 126 is successful. In an example embodiment, the success rate threshold may be predetermined and may be programmed in the RFID printer 100 at the time manufacturing.

If the calibration unit 410 determines, at step 1216, that encode success rate is greater than the success rate threshold, the calibration unit 410 may be configured to perform the step 1218. At step 1218, the RFID printer 100 includes means, such as the control system 206, the processor 402, the calibration unit 410, and/or the like, for determining an encoding result as successful. Further, the calibration unit 410 may be configured to store the encoding result in the second memory device 404. Additionally, the calibration unit 410 may be configured to store the RFID coupler angle and the power setting at which the encoding of the RFID inlay 126 is successful in the second memory device 404.

However, if the calibration unit 410 determines, at step 1216, that encode success rate is less than the success rate threshold, the calibration unit 410 may be configured to perform the step 1220. At step 1220, the RFID printer 100 includes means, such as the control system 206, the processor 402, the calibration unit 410, and/or the like, for determining the encoding result as unsuccessful. Further, the calibration unit 410 may be configured to store the encoding result in the second memory device 404 along with the RFID coupler angle and the power setting of the RFID coupler 104.

At step 1222, the RFID printer 100 includes means, such as the control system 206, the processor 402, the calibration unit 410 and/or the like, for determining whether the RFID control system 105 has attempted to encode the RFID inlay 126 at each power setting of the plurality of power settings, while the position of the second label 118c is unchanged (i.e., start portion of the first label 118b is aligned with the media sensor 204). For example, if the RFID control system 105 has initially attempted to encode the RFID inlay 126 in the second label 118c at the power setting-1, the calibration unit 410 may determine whether the RFID control system 105 has attempted to encode the RFID inlay 126 at other power settings of the plurality of power settings (i.e., power setting-2, power setting-3, and power setting-4), while the start portion of the second label 118c (i.e., the perforation 120) is aligned with the media sensor 204. If the calibration unit 410 determines that the RFID control system 105 has not attempted to encode the RFID inlay 126 at each power setting of the plurality of power settings, the calibration unit 410 may be configured to repeat the step 1210 at a different power setting. For example, if in the first encoding attempt the calibration unit 410 has caused the RFID control system 105 to attempt encoding of the RFID inlay 126 at the power setting-1, the calibration unit 410, on determining that the RFID control system 105 has not attempted to encode the RFID inlay 126 at other power settings of the plurality of power settings, may repeat the step 1210 at power setting-2. Accordingly, on repetition of the step 1210, the calibration unit 410 may be configured to transmit the instruction to attempt encoding of the RFID inlay at the power setting-2 (i.e., the power setting field in the instruction will have bits "01").

If at step 1222, the calibration unit 410 determines that the RFID control system 105 has attempted to encode the RFID inlay 126 at each power setting of the plurality of power settings, the calibration unit 410 may mark the encoding attempt at the current RFID coupler angle to be complete. Accordingly, the calibration unit 410 may be configured to perform the step 1224.

At step 1224, the RFID printer 100 includes means, such as the control system 206, the processor 402, the calibration unit 410 and/or the like, for determining whether the encoding result determined for each of the plurality of power settings at previous RFID coupler angles is consecutively unsuccessful for a predetermined encoding attempt count. In an example embodiment, the previous RFID coupler angles correspond to angles at which RFID control system 105 had previously made attempts to encode the RFID inlay 126 (e.g., RFID encoding attempt made at the default RFID coupler angle). For example, if the current RFID coupler angle is 15 degrees (at which the calibration unit 410 has attempted to encode the RFID inlay 126 at each power setting of the plurality of power settings) and the RFID coupler angles at which the RFID control system 105 has previously attempted to encode the RFID inlay 126 are 10 degrees and 5 degrees, the RFID coupler angles 15 degrees, 10 degrees, and 5 degrees are the previous RFID coupler angles. In some examples, because in the first encoding attempt, RFID coupler angle is set to the default RFID coupler angle when the start portion of the second label 118*c* is aligned with the media sensor 204, there are no previous RFID coupler angles at which the RFID control system 105 has attempted to encode the RFID inlay 126. Accordingly, the calibration unit 410 may be configured to perform the step 1226.

At step 1226, the RFID printer 100 includes means, such as the control system 206, the processor 402, the calibration unit 410, and/or the like, for determining whether the RFID control system 105 has attempted to encode the RFID inlay 126 at each of the one or more RFID coupler angles within the RFID coupler angle range. If the calibration unit 410 determines that the RFID control system 105 has not attempted to encode the RFID inlay 126 at each of the one or more RFID angles, the calibration unit 410 may be configured to perform the step 1228.

At step 1228, the RFID printer 100 includes means, such as the control system 206, the processor 402, the calibration unit 410, the I/O device interface unit 408 and/or the like, for causing the RFID coupler 104 to rotate by the predetermined angle. As discussed above, the predetermined angle may correspond to the step size or a multiple of the step size by which the second electrical drive can rotate. In an example embodiment, the I/O device interface unit 408 may instruct the second electrical drive to rotate by the predetermined angle, causing the RFID coupler 104 to rotate by the predetermined angle. At step 1230, the RFID printer 100 includes means such as the control system 206, the processor 402, the calibration unit 410, the I/O device interface unit 408 and/or the like for resetting the power setting of RFID coupler 104 to the default power setting. Thereafter, the step 1210 is repeated.

If at step 1226, the calibration unit 410 determines that the RFID control system 105 has attempted to encode the RFID inlay 126 at each of the one or more RFID coupler angles within the RFID coupler angle range, the calibration unit 410 may perform the step 1232. At step 1232, the RFID printer 100 includes means such as the control system 206, the processor 402, the calibration unit 410, and/or the like for determining minimum RFID coupler angle at which the encoding of the RFID inlay 126 was successful at the current position of the second label 118*c* (e.g., the start portion of the second label aligns with the media sensor 204). For example, at the current position of the second label 118*c*, the calibration unit 410 determines that the RFID inlay 126 is successfully encoded at the RFID coupler angles of 0 degrees and 5 degrees (retrieved from the second memory device 404 (refer step 1218)). Accordingly, the calibration unit 410 determines that the minimum RFID coupler angle at which the encoding is successful is 0 degrees.

Thereafter, at step 1234, the RFID printer 100 includes means, such as the control system 206, the processor 402, the calibration unit 410, the I/O device interface unit 408, and/or the like, for resetting the RFID coupler angle to the determined minimum RFID coupler angle (e.g., 0 degrees). In an example embodiment, the I/O device interface unit 408 may be configured to actuate the second electrical drive to cause the RFID coupler 104 to rotate to the determined minimum RFID coupler angle.

At step 1236, the RFID printer 100 includes means, such as the control system 206, the processor 402, the calibration unit 410, the I/O device interface unit 408, and/or the like, for causing the media 116 to traverse along the media path 122 by the first travel distance. For example, the I/O device interface unit 408 may be configured to actuate the first electrical drive to cause the media 116 to traverse along the media path 122 by the first travel distance. Thereafter, at step 1238, the RFID printer 100 includes means such as the control system 206, the processor 402, the calibration unit 410, and/or the like for determining whether the total distance traversed by the media 116 is greater than or equal to the second travel distance. If the calibration unit 410 determines that the total distance traversed by the media 116 along the media path 122 is greater than or equal to the second travel distance, the calibration unit 410 may be configured to perform the step 1240. However, if the calibration unit 410 determines that the total distance traversed by the media 116 along the media path 122 is less than the second travel distance, the calibration unit 410 may be configured to repeat the step 1210.

At step 1240, the RFID printer 100 includes means, such as the control system 206, the processor 402, the calibration unit 410, and/or the like, for generating the angle correlation and the power correlation based on the stored encoding results and the corresponding RFID coupler angle and the corresponding power settings. The generation of the angle correlation and the power correlation are further described in conjunction with FIG. 14.

Referring back to step 1224, if at step 1224, the calibration unit 410 determines that the encoding result determined for each of the plurality of power settings at previous RFID coupler angles is consecutively unsuccessful for a predetermined encoding attempt count, the calibration unit 410 may be configured to repeat the step 1234.

Figure 14:
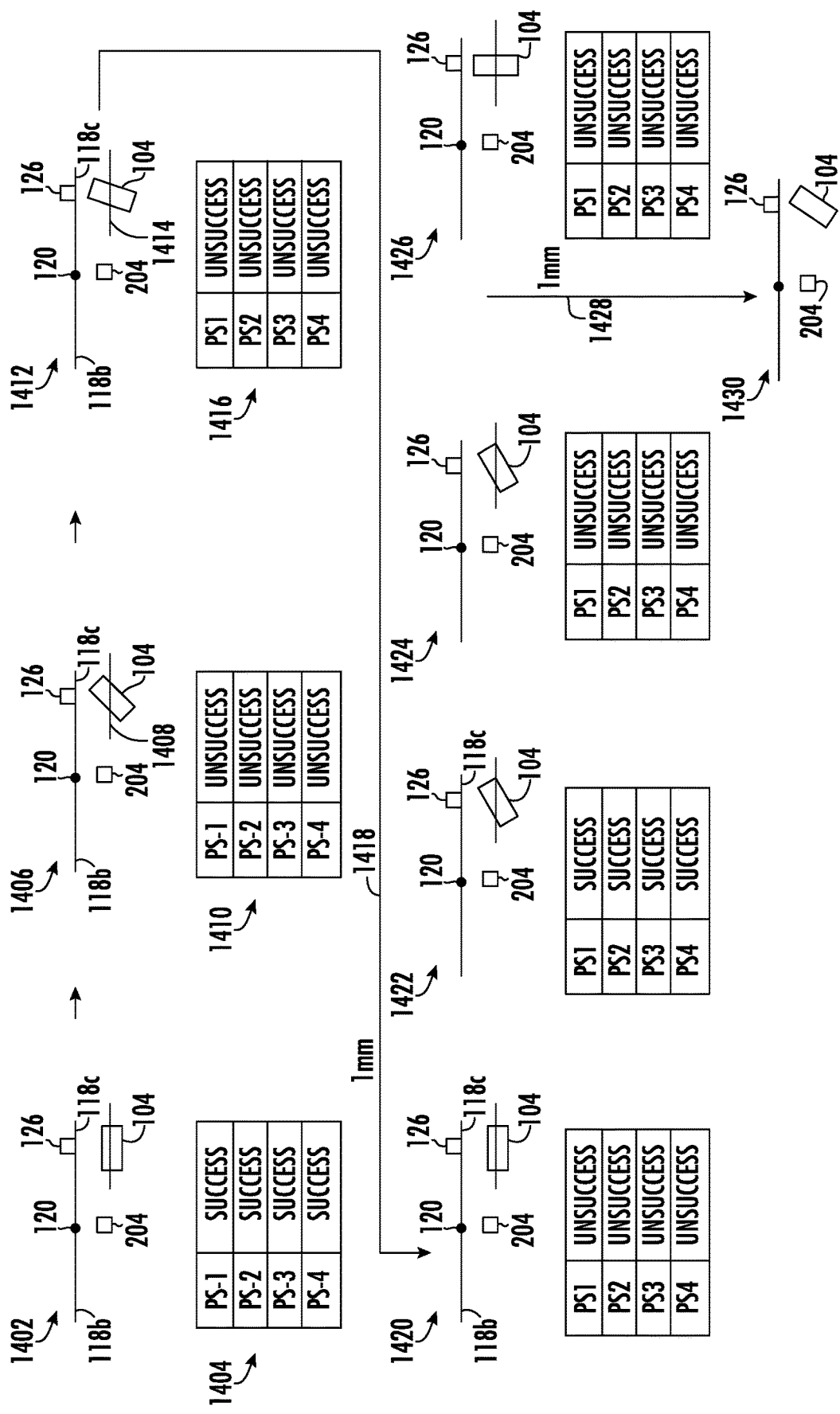
FIG. 14 illustrates an example calibration flow of the RFID printer, according to one or more embodiments described herein.

FIG. 14 illustrates an example calibration flow 1400 of the RFID printer 100, according to one or more embodiments described herein.

The example calibration flow 1400 illustrates a schematic 1402, which depicts that the start portion (i.e., the perforation 120) of the second label 118*c* is aligned with the media sensor 204. Further, the schematic 1402 depicts that the RFID inlay 126 is positioned directly above the RFID coupler 104. Further the RFID coupler angle in the schematic 1402 is 0 degrees.

The calibration unit 410 may instruct the RFID control system 105 to initiate first encoding attempt to encode the RFID inlay 126 on the second label 118*c* at each of the plurality of power settings, as described above in steps 1210 through 1222. Accordingly, the calibration unit 410 may store the encoding results at each of the plurality of power settings, as illustrated in the table 1404. From table 1404, it can be observed that the encoding of the RFID inlay 126 is successful at each of the plurality of power settings while the RFID coupler angle is zero degrees.

After attempting to encode the RFID inlay 126 at each of the plurality power settings, the calibration unit 410 may determine whether encoding result at previous RFID coupler angles is unsuccessful consecutively for the predetermined encoding attempt count (refer to step 1224). Because the RFID control system 105 has not attempted to encode the RFID inlay 126 at any previous RFID coupler angles when the start portion of the second label 118c is aligned with the media sensor 204, the calibration unit 410 may determine that the encoding results have not been consecutively unsuccessful for the predetermined encoding attempt count (e.g., 2). Accordingly, the I/O device interface unit 408 may cause the RFID coupler 104 to rotate by the predetermined angle, as illustrated in the schematic 1406.

The schematic 1406 depicts that the RFID coupler 104 has the RFID coupler angle (e.g., 1408). Further, the schematic 1406 depicts that the position of the second label 118c remains the same as the position of the second label 118c illustrated in schematic 1402. In an example embodiment, the calibration unit 410 may cause the RFID control system 105 to initiate another encoding attempt to encode the RFID inlay 126 at each of the plurality of power settings. Further, the calibration unit 410 may be configured to store the encoding results in the second memory device 404. The table 1410 illustrates the encoding results determined by the calibration unit 410. It can be observed that the encoding is unsuccessful at each of the plurality of power settings.

After determining the encoding result, the calibration unit 410 may be configured to determine whether the encoding results are unsuccessful at previous RFID coupler angles consecutively for the predetermined encoding attempt count (e.g., 2). Here, because the encoding was successful in the previous iteration (i.e., represented by the schematic 1402), the calibration unit 410 determines that the encoding results have not been consecutively unsuccessful at previous RFID coupler angles. Accordingly, the I/O device interface unit 408 may cause the RFID coupler 104 to rotate by the predetermined angle (e.g., depicted by schematic 1412) and the aforementioned process is repeated.

The schematic 1412 depicts that the RFID coupler 104 has the RFID coupler angle 1414, which is twice the predetermined angle (as the RFID coupler 104 is rotated by the predetermined angle twice). After the RFID control system 105 attempts to encode the RFID inlay 126 at each of the plurality of power settings, the calibration unit 410 determines the encoding results as depicted in table 1416. From the table 1416, it can be observed that the encoding of the RFID inlay 126 is unsuccessful. Further, the calibration unit 410 determines that the encoding is unsuccessful at both the current RFID coupler angle 1414 (refer schematic 1412), and the previous RFID coupler angle 1408 (refer schematic 1406). Therefore, the encoding of the RFID inlay 126 has failed two times consecutively (i.e., the encoding attempts illustrated in the schematics 1406 and 1412). Accordingly, the calibration unit 410 resets the RFID coupler angle and power setting of the RFID coupler 104. Further, the I/O device interface unit 408 may cause the media 116 to traverse along the media path 122 by 1 mm (e.g., depicted by 1418).

As discussed above in step 1226, in the RFID coupler angle is reset to the minimum RFID coupler angle at which the encoding was successful in the previous iteration (i.e., while the start portion of the second label 118c was aligned with the media sensor 204). Therefore, the schematic 1420 depicts that the RFID coupler 104 has the RFID coupler angle of 0 degrees.

Thereafter, the iteration of attempting encoding of the RFID inlay 126 is repeated at each of the one or more RFID coupler angles and each of the plurality of power settings, as depicted through the schematics 1420-1426. Further, the calibration unit 410 may be configured to determine and store the encoding results associated with each of the one or more RFID coupler angles (depicted in schematics 1420-1426) in the second memory device 404. For example, the encoding results for encoding attempts made by the RFID control system 105 (depicted in the schematic 1420) are unsuccessful. Similarly, the encoding results of the encoding attempts made by RFID control system 105, depicted in the schematics 1422, 1424, and 1426, are successful, unsuccessful, and unsuccessful, respectively. Because the encoding result at RFID coupler angles depicted in the schematics 1424 and 1426 have been consecutively unsuccessful for two times, the calibration unit 410 may be configured to determine a minimum angle at which the encoding was successful while the total distance traversed by the media is 1 mm (i.e., the current position of the label 118c). It can be observed that the RFID coupler angle at which the encoding was successful in the previous iteration is depicted in the schematic 1422. Therefore, the I/O device interface unit 408 may cause the RFID coupler 104 to rotate to an RFID coupler angle as depicted in the schematic 1422. Thereafter, the I/O device interface unit 408 may cause the media 116 to traverse along the media path 122 by 1 mm (e.g., depicted by 1428). Such a configuration is depicted in the schematic 1430. The schematic 1430 depicts that the total distance traversed by the media is 2 mm and the RFID coupler angle is same as the RFID coupler angle depicted in the schematic 1422. Thereafter, the calibration unit 410 generates the power correlation and the angle correlation.

As discussed above, the calibration unit 410 may be configured to store the encoding results determined at each of the one or more RFID coupler angles at each of the plurality of power settings (e.g., tables 1404, 1410, and 1416) in the second memory device 404. In some examples, the calibration unit 410 may be configured to collate the encoding results determined at each of the one or more RFID coupler angles and at each of the plurality of power settings to generate the angle correlation and the power correlation. Following table illustrates the angle correlation and the power correlation:

TABLE 4

Illustrating Angle correlation and the power correlation

| Position of the second label | RFID coupler angle | Power Setting | Encoding result |
|---|---|---|---|
| 0 mm | 0 degrees | Power setting-1 | Success |
| | | Power setting-2 | Success |
| | | Power setting-3 | Success |
| | | Power setting-4 | Success |
| | 10 degrees | Power setting-1 | Unsuccessful |
| | | Power setting-2 | Unsuccessful |
| | | Power setting-3 | Unsuccessful |
| | | Power setting-4 | Unsuccessful |
| | 20 degrees | Power setting-1 | Unsuccessful |
| | | Power setting-2 | Unsuccessful |
| | | Power setting-3 | Unsuccessful |
| | | Power setting-4 | Unsuccessful |

TABLE 4-continued

Illustrating Angle correlation and the power correlation

| Position of the second label | RFID coupler angle | Power Setting | Encoding result |
|---|---|---|---|
| 1 mm | 0 degrees | Power setting-1 | Unsuccessful |
| | | Power setting-2 | Unsuccessful |
| | | Power setting-3 | Unsuccessful |
| | | Power setting-4 | Unsuccessful |
| | 10 degrees | Power setting-1 | success |
| | | Power setting-2 | success |
| | | Power setting-3 | success |
| | | Power setting-4 | success |
| | 20 degrees | Power setting-1 | Unsuccessful |
| | | Power setting-2 | Unsuccessful |
| | | Power setting-3 | Unsuccessful |
| | | Power setting-4 | Unsuccessful |
| | 30 degrees | Power setting-1 | Unsuccessful |
| | | Power setting-2 | Unsuccessful |
| | | Power setting-3 | Unsuccessful |
| | | Power setting-4 | Unsuccessful |
| 2 mm | 10 degrees | Power setting-1 | success |
| | | Power setting-2 | success |
| | | Power setting-3 | success |
| | | Power setting-4 | success |

From table 4, it can be observed that when the total distance traversed by the media 116 is 0 mm, the encoding of the RFID inlay 126 is successful at RFID coupler angle of 0 degrees. Further, the encoding is successful at each of the plurality of power settings when the RFID angle is 0 degrees and the total distance traversed by the media 116 is 0 mm. Similarly, it can be observed that when the total distance traversed by the media 116 is 1 mm, the encoding of the RFID inlay 126 is successful at RFID coupler angle of 10 degrees at each of the plurality of power settings. In an example embodiment, the relationship between the encoding result at the one or more RFID coupler angles and the various positions of the second label 118c corresponds to the angle correlation. In an example embodiment, the relationship between the encoding result at each of the plurality of power settings and the one or more RFID coupler angles corresponds to the power correlation.

In some examples, the table 4 is illustrated for exemplary purposes. In an example embodiment, the table 4 may include additional entries corresponding to various positions of the second label 118c.

In some examples, the scope of the disclosure is not limited to the RFID printer 100 being calibrated in such a manner that when the start portion of the second label 118c is aligned with the media sensor 204, the calibration of the RFID inlay 126 on the second label 118c is successful at 0 degrees RFID coupler angle. In some examples, the RFID coupler angle at which the encoding of the RFID inlay 126 is successful (the start portion of the second label 118c is aligned with the media sensor 204) may be dependent on the length of the plurality of labels 118. On such example calibration process is illustrated in FIG. 15.

Figure 15:
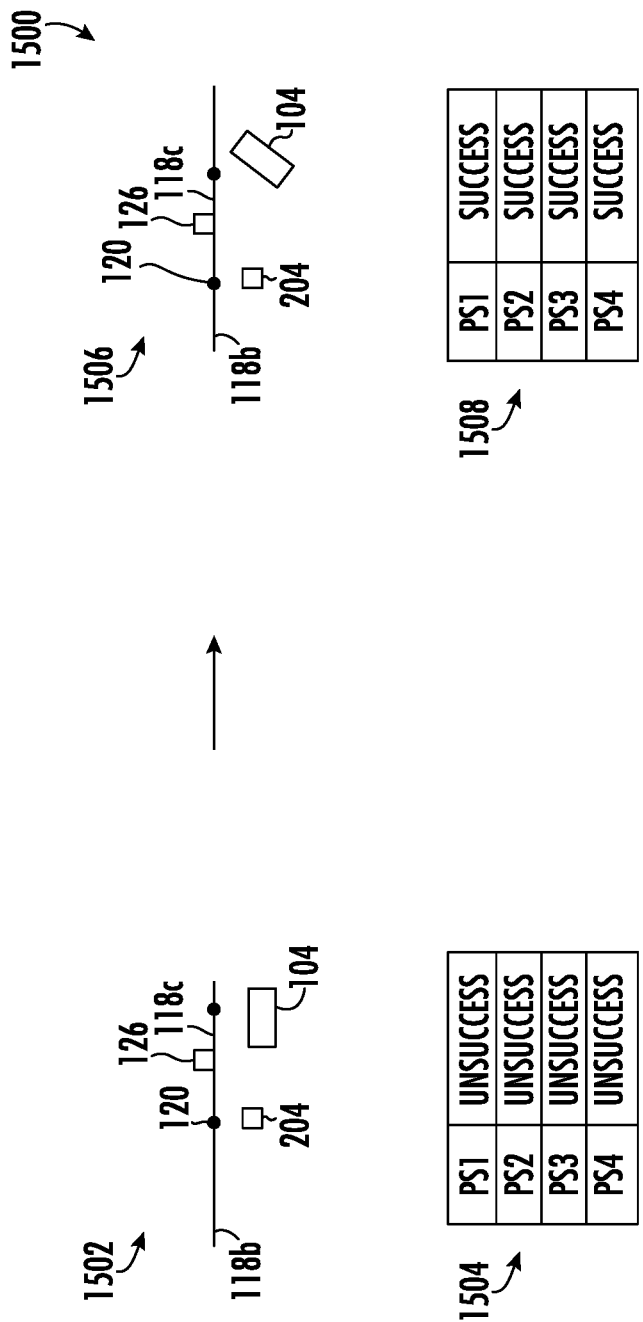
FIG. 15 illustrates yet another example calibration flow of the RFID printer, according to one or more embodiments described herein.

FIG. 15 illustrates yet another example calibration flow 1500 of the RFID printer 100, according to one or more embodiments described herein.

The calibration flow 1500 illustrates a schematic 1502 that depicts that when the start portion (the perforation 120) of the second label 118c is aligned with the media sensor 204, the RFID inlay 126 on the second label 118c is not aligned with the RFID coupler 104. During the calibration, the I/O device interface unit 408 may initially cause the RFID coupler 104 to rotate to the default RFID coupler angle, which is 0 degrees.

Further, the calibration unit 410 may cause the RFID control system 105 to attempt encoding of the RFID inlay 126 on the second label 118c. Because the RFID coupler 104 is not aligned with the RFID inlay 126, the attempt to encode the RFID inlay 126 may be unsuccessful at each of the plurality of power settings, as depicted by the table 1504. Accordingly, the I/O device interface unit 408 may cause the RFID coupler 104 to rotate by the predetermined angle, as depicted in the schematic 1506.

After modifying the RFID coupler angle, the calibration unit 410 may cause the RFID control system 105 to re-attempt encoding of the RFID inlay 126 at the plurality of power settings. Because after modifying the RFID coupler angle, the RFID coupler 104 may point towards the RFID inlay 126 on the second label 115c, and the attempt to encode the RFID inlay 126 may be successful, as depicted by the table 1508. Accordingly, the calibration unit 410 may determine the angle correlation that, when start portion of the second label 118c is aligned with the media sensor 204, the encoding of the RFID inlay 126 is successful if the RFID coupler angle is equal to the predetermined angle.

Therefore, the RFID printer 100, in accordance with the one or more embodiments of the present disclosure, is able to generate/modify the angle correlation and the power correlation in accordance with the length of the label. For instance, if the user of the RFID printer 100 loads a new media in the RFID printer 100, the calibration unit 410 may be capable of calibrating the RFID printer 100 in accordance with the modified media (for example based on the length of the labels in the newly loaded media).

Referring back to FIG. 5, at step 502, if the processor 402 determines that the input to operate the RFID printer 100 in the calibration mode is not received, the processor 402 may be configured to perform the step 506. At step 506, the RFID printer includes means, such as the control system 206, the processor 402, the encoding operation unit 412, and/or the like, for operating the RFID printer 100 in the encoding mode. The operation of the RFID printer in the encoding mode is described in conjunction with FIG. 16.

FIG. 16 illustrates a flowchart 1600 of a method for operating the RFID printer 100 in the encoding mode, according to one or more embodiments described herein.

At step 1602, the RFID printer 100 includes means, such as the control system 206, the processor 402, the encoding operation unit 412, and/or the like, for receiving the encoding job. Further, the encoding operation unit 412 may be configured to extract the data to be encoded in the RFID inlay 126 from the encoding job. In an example embodiment, the data to be encoded may be in accordance with one or more of the EPCglobal formats, and/or DOD formats.

At step 1604, the RFID printer 100 includes means, such as the control system 206, the processor 402, the encoding operation unit 412, the I/O device interface unit 408, and/or the like, for initializing the RFID coupler 104 and the position of the media 116.

In an example embodiment, the I/O device interface unit 408 may initialize the position of the media 116 in such a manner that a start portion (e.g., perforation) of the third label 118d is aligned with the media sensor 204. In some embodiments, initializing the position of the media 116 may not be required. In such an embodiment, the I/O device interface unit 408 may always cause the media 116 to halt in such a manner that the perforation 120 on the media 116 aligns with the media sensor 204. Therefore, prior to operating the RFID printer 100 in the encoding mode, the media 116 may already be positioned in the such a manner that the start portion of the third label 118d may be aligned with the media sensor 204.

In an example embodiment, to initialize the RFID coupler 104, the encoding operation unit 412 may be configured to retrieve the angle correlation and the power correlation from the second memory device 404. Thereafter, based on the angle correlation and the power correlation, the encoding operation unit 412 may be configured to determine the RFID coupler angle and the power setting of the plurality of power settings at which the encoding was determined to be successful during the calibration process when the start portion (the perforation 120) of the third label 118d is aligned with the media sensor 204. For example, the encoding operation unit 412 may determine that when the start portion of the third label 118d is aligned with the media sensor 204, the RFID coupler angle is zero degrees and the power setting at which the RFID coupler 104 is to be operated is "power setting-1". Accordingly, the encoding operation unit 412 may instruct the I/O device interface unit 408 to cause the RFID coupler 104 to rotate to the determined RFID coupler angle (e.g., 0 degrees). Further, the encoding operation unit 412 may instruct the RFID control system 105 to operate at the "power setting-1".

At step 1606, the RFID printer 100 includes means such as the control system 206, the processor 402, the encoding operation unit 412, the I/O device interface unit 408, and/or the like for causing the media 116 to traverse along the media path 122 at a predetermined linear speed. To cause the media to traverse along the media path 122 at the predetermined linear speed, the I/O device interface unit 408 may cause the first electrical drive to rotate at the predetermined angular velocity.

At step 1608, the RFID printer 100 includes means such as the control system 206, the processor 402, the encoding operation unit 412, the I/O device interface unit 408, the signal processing unit 414, and/or the like for receiving the input signal from the media sensor 204 when the media 116 traverses along the media path 122. At step 1610, the RFID printer 100 includes means such as the control system 206, the processor 402, the encoding operation unit 412, the I/O device interface unit 408, and/or the like for determining a real-time position of the third label 118d with respect to the media sensor 204. The determination of the real-time position of the third label 118d is further described in conjunction with FIG. 17.

Figure 17:
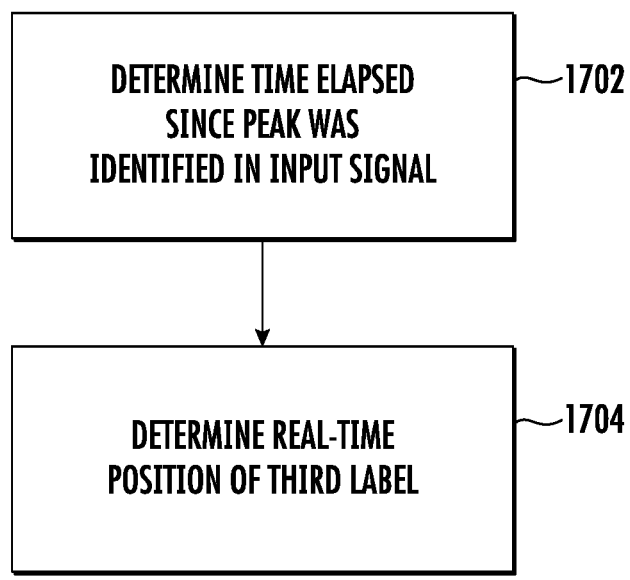
FIG. 17 illustrates a flowchart of a method for determining a real-time position of a third label, according to one or more embodiments described herein.

FIG. 17 illustrates a flowchart of a method for determining the real-time position of the third label, according to one or more embodiments described herein.

At step 1702, the RFID printer 100 includes means, such as the control system 206, the processor 402, the encoding operation unit 412, the signal processing unit 414, and/or the like for determining a time elapsed since a peak was identified in the input signal. In an example embodiment, the signal processing unit 414 may be configured to identify the peak in the input signal using one or more signal processing techniques. In some embodiments, when the traversal of the media 116 is initiated from the initial position (i.e., the position where the start portion of the third label 118d aligns with the media sensor 204), the signal processing unit 414 may not be able to detect the peak in the input signal until next perforation 120 in the media 116 passes over the media sensor 204. However, since the initial position corresponds to the position where the perforation 120 aligns with the media sensor 204, therefore, the signal processing unit 414 may initially consider that peak in the input signal has been identified.

In an example embodiment, the time elapsed since the identification of the peak in the input signal may indicate the real-time position of the third label 118d with respect to the media sensor 204. In some embodiments, since the media 116 traverses along the media path 122 with the predetermined linear speed, therefore, the time elapsed since the signal processing unit 414 identified the peak in the input signal may be indicative of the real-time position of the third label 118d.

At step 1704, the RFID printer 100 includes means, such as the control system 206, the processor 402, the encoding operation unit 412, the I/O device interface unit 408, the signal processing unit 414 and/or the like for determining the real-time position of the third label 118d based on the determined time elapsed. For example, if the predetermined linear speed is 2 mm/per second and the time elapsed since the peak was identified by the signal processing unit 414 is 0.5 seconds, the encoding operation unit 412 may determine that the real time position of the third label 118d to be at the distance of 1 mm from the media sensor 204.

Referring back to FIG. 16, at step 1611, the RFID printer 100 includes means, such as the control system 206, the processor 402, the encoding operation unit 412, the I/O device interface unit 408, and/or the like, for causing the RFID control system 105 to initiate encoding of the RFID inlay 126 on the third label 118d. In an example embodiment, to initiate the encoding of the RFID inlay 126 on the third label 118d, the encoding operation unit 412 may be configured to retrieve a power setting and an RFID coupler angle from the power correlation and the angle correlation (stored in the second memory device 404), respectively, based on the determined real-time position of the third label 118d. For example, when the real-time position of the third label 118d is 1 mm from the media sensor 204, the encoding operation unit 412 determines that the RFID coupler angle should be 10 degrees based on table 4. Further, the encoding operation unit 412 determines the power setting of the RFID coupler 104 as the "power setting-1".

Thereafter, the encoding operation unit 412 may transmit an instruction to the RFID control system 105 to initiate encoding of the RFID inlay 126 on the third label 118d. As discussed above, the instruction includes the combination of bits indicative of the retrieved power setting (e.g., "power setting-1") in addition to the data to be encoded (received in the encoding job). Further, the encoding operation unit 412 may instruct the I/O device interface unit 408 to cause the RFID coupler 104 to rotate to the retrieved RFID coupler angle (e.g., 10 degrees).

On receiving the instruction to initiate the encoding of the RFID inlay 126, the power modification unit 314 in the RFID control system 105 may be configured modify the signal transmission power of the RFID coupler 104. Thereafter, the RFID encoder 308 in the RFID control system 105 may be configured to transmit the data to the RFID inlay 126. After transmitting the data to the RFID inlay 126 on the third label 118d, the verification unit 312 in the RFID control system 105 may be configured to determine whether the data has been encoded correctly on the RFID inlay 126, as described in the flowcharts 1000 and 1300. Accordingly, the verification unit 312 may transmit the status signal to the control system 206.

At step 1612, the RFID printer 100 includes means, such as the control system 206, the processor 402, the encoding operation unit 412, the I/O device interface unit 408, and/or the like, for determining whether the encoding of the RFID inlay 126 on the third label 118d is complete. In an example embodiment, the encoding operation unit 412 may determine the completion of the encoding of the RFID inlay 126 based on the reception of the status signal from the RFID control system 105. If encoding operation unit 412 determines that the status signal is not received, the encoding operation unit 412 determines that the RFID control system 105 is still encoding the RFID inlay 126. Accordingly, the encoding operation unit 412 may perform the step 1614. However, if the encoding operation unit 412 determines that the status signal is received, the encoding operation unit performs the step 1620.

At step 1614, the RFID printer 100 includes means, such as the control system 206, the processor 402, the encoding operation unit 412, and/or the like, for determining whether a real-time total distance traversed by the media 116 is greater than or equal to the second travel distance (for example, 1.5 times the length of the label). In an example embodiment, the real-time total distance traversed by the media 116 may be determined based on the time elapsed since the peak was identified by the signal processing unit 414 in the input signal, as described above in the flowchart 1700. If the encoding operation unit 412 determines that the real-time total distance traversed by the media 116 is greater than the second travel distance, the encoding operation unit 412 may be configured to perform the step 1616.

At step 1616, the RFID printer 100 includes means, such as the control system 206, the processor 402, the encoding operation unit 412, and/or the like, for determining that encoding of the RFID inlay 126 has failed. Accordingly, at step 1618, the RFID printer 100 includes means, such as the control system 206, the processor 402, the encoding operation unit 412, the I/O device interface unit 408, and/or the like, for generating an error notification indicating that the encoding of the RFID inlay 126 has failed. In an example embodiment, the error notification may correspond to a visual notification such as switching an LED, on the RFID printer 100, ON. In alternative embodiments, the error notification may correspond to generating an audio signal. At step 1620, the RFID printer 100 includes means, such as the control system 206, the processor 402, the encoding operation unit 412, the I/O device interface unit 408, and/or the like, for stopping the encoding process.

If, at step 1614, the encoding operation unit 412 determines that the real-time total distance traversed by the media is less than the second travel distance, the encoding operation unit 412 may be configured to repeat the step 1610. Repeating the step 1610 enables the encoding operation unit 412 to determine a new real-time position of the third label 118*d* with respect to the media sensor 204. Based on the new real-time position, in some examples, the power setting and the RFID coupler angle of the RFID coupler 104 are updated and the encoding of the RFID inlay 126 on the third label 118*d* is continued. Therefore, the encoding operation unit 412 causes the RFID coupler 104 to rotate in accordance with the traversal of the media 116 along the media path 122. Because the traversal of the media is not halted during the encoding process, the encoding of the RFID inlay 126 in accordance with the disclosed embodiments is much faster in comparison to the conventional techniques. Further, because the angle correlation and the power correlation are determined through the calibration process for each possible positions of the label with respect to the media sensor 204, therefore, at the start of the encoding of the RFID inlay 126, there is no need to retract the media along the media path 122 to align the RFID inlay 126 on the media with the RFID coupler 104.

In some examples, the scope of the disclosure is not limited to rotating the RFID coupler 104 in accordance with the traversal of the media along the media path. In an alternative embodiment, the encoding operation unit 412 may cause the RFID coupler 104 to rotate to an RFID coupler angle, which is determined based on the angle correlation. Thereafter, the encoding operation unit 412 may cause the RFID control system 105 to encode the RFID inlay on the third label in such a manner that the RFID coupler angle remains fixed throughout the encoding process, while the media traverses along the media path. In such an embodiment, the encoding operation unit 412 may cause the RFID control system 105 to modify the power setting at which the RFID coupler 104 operates based on the real-time position of the third label with respect to the media sensor 204. In an example embodiment, the power setting at which the RFID coupler 104 has to be operate may be determined based on the power correlation.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor 402 may be any processor, controller, or state machine. A processor 402 may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor 402-readable media. These instructions may be embodied by one or more processor 402-executable software modules that reside on the one or more non-transitory computer-readable or processor 402-readable storage media. Non-transitory computer-readable or processor 402-readable storage media may in this regard comprise any storage media that may be accessed by a computer or a processor 402. By way of example but not limitation, such non-transitory computer-readable or processor 402-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor 402-readable media. Additionally, any combination of instructions stored on the one or more non-transitory processor 402-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A Radio Frequency Identification (RFID) printer comprising:
    a media hub configured to receive a media roll and supply a media from the media roll along a media path, wherein the media includes a plurality of labels, wherein each label of the plurality of labels comprises an RFID inlay;
    an RFID coupler rotatably positioned adjacent to the media path;
    an RFID control system communicatively coupled to the RFID coupler, wherein the RFID control system is configured to encode the RFID inlay through the RFID coupler;
    a media sensor configured to generate input signals indicative of positions of the plurality of labels along the media path with respect to the media sensor; and
    a processor communicatively coupled to the RFID control system and the media sensor, wherein the processor is configured to:
        determine a real-time position of a first label of the plurality of labels while the media travels along the media path based on the input signals from the media sensor, wherein the first label includes a first corresponding RFID inlay,
        cause the RFID control system to initiate encoding of the first corresponding RFID inlay,
        cause the RFID coupler to rotate based on the real-time position of the first label,
        wherein the processor is configured to cause the RFID control system to continue encoding of the first corresponding RFID inlay, through the RFID coupler, until the first corresponding RFID inlay is successfully encoded, and
        cause the RFID printer to operate in a calibration mode, wherein the processor, in the calibration mode, is further configured to:
            cause the media to travel by a first travel distance along the media path, and
            cause the RFID control system to initiate a first encoding attempt to encode a second corresponding RFID inlay on a second label of the plurality of labels.

2. The RFID printer of claim 1, wherein the processor, in the calibration mode, is further configured to:
    in response to determining that the first encoding attempt is unsuccessful:
        (1) cause the RFID coupler to rotate by a predetermined angle; and
        (2) cause the RFID control system to initiate another encoding attempt to encode the second corresponding RFID inlay;
    repeat steps (1) and (2) until the second corresponding RFID inlay is successfully encoded;
    determine an angle of the RFID coupler at which the encoding of the second corresponding RFID inlay is successful;
    determine a real-time position of the second label at which the encoding of the second corresponding RFID inlay on the second label is successful based on the input signals generated by the media sensor; and
    generate an angle correlation between the determined angle of the RFID coupler and the determined position of the second label.

3. The RFID printer of claim 1, wherein the processor, in the calibration mode, is further configured to:
    in response to determining that the first encoding attempt is successful:
        cause the media to travel by the first travel distance along the media path;
        cause the RFID coupler to rotate to a default angle; and
        cause the RFID control system to initiate a second encoding attempt to encode the second corresponding RFID inlay on the second label of the plurality of labels.

4. The RFID printer of claim 1, wherein the processor, in the calibration mode, is further configured to:
    in response to determining that the first encoding attempt is successful:
        cause the RFID coupler to rotate by a predetermined angle; and
        cause the RFID control system to initiate a second encoding attempt to encode the second corresponding RFID inlay.

5. The RFID printer of claim 1, wherein the processor, in the calibration mode, is further configured to:
    in response to determining that the first encoding attempt is unsuccessful:
        (1) cause the RFID coupler to rotate by a predetermined angle;
        (2) cause the RFID control system to initiate another encoding attempt to encode the second corresponding RFID inlay; and
    repeat steps (1) and (2) until the encoding of the second corresponding RFID inlay is consecutively unsuccessful for a predetermined encoding count.

6. The RFID printer of claim 5, wherein the processor, in the calibration mode, is further configured to:
in response to determining that encoding is consecutively unsuccessful for the predetermined encoding count:
determine one or more angles of the RFID coupler at which the encoding of the second corresponding RFID inlay is successful;
determine a position of the second label at which the encoding of the second corresponding RFID inlay on the second label is successful based on the input signals generated by the media sensor;
generate an angle correlation between the one or more angles of the RFID coupler and the determined position of the second label;
cause the media to travel by the first travel distance along the media path;
determine a minimum angle amongst the one or more angles;
cause the RFID coupler to rotate to the minimum angle; and
cause the RFID control system to initiate another encoding attempt to encode the second corresponding RFID inlay.

7. The RFID printer of claim 1, wherein the processor, in the calibration mode, is further configured to:
determine an angle of the RFID coupler;
cause the RFID control system to initiate another encoding attempt to encode the second corresponding RFID inlay at a plurality of power settings;
determine, for each of the plurality of power settings, whether the encoding of the second corresponding RFID inlay is successful; and
generate a power correlation between the angle of the RFID coupler and the plurality of power settings of the RFID coupler based on determining whether the encoding of the second corresponding RFID inlay is successful at each of the plurality of power settings.

8. The RFID printer of claim 1, wherein the processor, in the calibration mode, is further configured to:
in response to determining that the first encoding attempt is unsuccessful:
(1) modify a power setting of the RFID coupler, and
(2) cause the RFID control system to initiate another encoding attempt to encode the second corresponding RFID inlay,
repeat steps (1) and (2) until at least the second corresponding RFID inlay is successfully encoded or the RFID control system has attempted to encode the second corresponding RFID inlay at each of a plurality of power settings.

9. The RFID printer of claim 8, wherein the processor, in the calibration mode, is further configured to:
in response to determining that the RFID control system has attempted to encode the second corresponding RFID inlay at each of the plurality of power settings:
reset the power setting of the RFID coupler;
cause the RFID coupler to rotate by a predetermined angle; and
cause the RFID control system to initiate another encoding attempt to encode the second corresponding RFID inlay.

10. The RFID printer of claim 9, wherein the processor, in the calibration mode, is further configured to:
in response to determining that the RFID control system has successfully encoded the second corresponding RFID inlay:
determine the power setting of the RFID coupler;
determine an angle of the RFID coupler;
determine the position of the second label based on the input signals generated by the media sensor;
generate an angle correlation between the determined angle of the RFID coupler and the determined position of the second label; and
generate a power correlation between the determined power setting of the RFID coupler and the determined angle of the RFID coupler.

11. The RFID printer of claim 8, wherein the processor is further configured to reset an angle and the power setting of the RFID coupler when a total distance traveled by the media during the calibration mode is equal to a second travel distance.

12. A method for encoding a Radio Frequency Identification (RFID) inlay, the method comprising:
causing, by a processor, a media to travel along a media path in an RFID printer, the media includes a plurality of labels, wherein each label of the plurality of labels comprises an RFID inlay;
determining, by the processor, a real-time position of a first label while the media travels along the media path based on an input signal received from a media sensor, wherein the first label includes a first corresponding RFID inlay;
causing, by the processor, an RFID control system to initiate encoding of the first corresponding RFID inlay;
causing, by the processor, the RFID coupler to rotate based on the real-time position of the first label, wherein the RFID control system is caused to continue encoding of the first corresponding RFID inlay, through the RFID coupler, until the first corresponding RFID inlay is successfully encoded; and
causing, by the processor, the RFID printer to operate in a calibration mode, comprising:
causing, by the processor, the media to travel by a first travel distance along the media path; and
causing, by the processor, the RFID control system to initiate a first encoding attempt to encode a second corresponding RFID inlay on a second label of the plurality of labels.

13. The method of claim 12, further comprising:
in response to determining that the encoding of the second corresponding RFID inlay is unsuccessful:
causing, by the processor, the RFID coupler to rotate by a predetermined angle and initiate another attempt to encode the second corresponding RFID inlay until the second corresponding RFID inlay is successfully encoded;
determining, by the processor, an angle of the RFID coupler at which the encoding of the second corresponding RFID inlay is successful;
determining, by the processor, a position of the second label at which the encoding of the second corresponding RFID inlay on the second label is successful based on the input signal received from the media sensor; and
generating, by the processor, an angle correlation between the determined angle of the RFID coupler and the determined position of the second label.

14. The method of claim 12, further comprising:
in response to determining that the encoding of the second corresponding RFID inlay is successful:
causing, by the processor, the media to travel by the first travel distance along the media path;
causing, by the processor, the RFID coupler to rotate to a default angle; and causing, by the processor, the RFID control system to initiate a second encoding attempt to encode the second corresponding RFID inlay on the second label of the plurality of labels.

15. The method of claim 12, further comprising:

in response to determining that the first encoding attempt to encode the second corresponding RFID inlay is successful:
- causing, by the processor, the RFID coupler to rotate by a predetermined angle, and
- causing, by the processor, the RFID control system to initiate a second encoding attempt to encode the second corresponding RFID inlay.

16. The method of claim 12, further comprising:

in response to determining that the first encoding attempt is unsuccessful:
- causing, by the processor, the RFID coupler to rotate by a predetermined angle; and
- causing, by the processor, the RFID control system to initiate another encoding attempt to encode the second corresponding RFID inlay until the encoding of the second corresponding RFID inlay is consecutively unsuccessful for a predetermined encoding count;

in response to determining that the encoding is unsuccessful for the predetermined encoding count:
- determining, by the processor, one or more angles of the RFID coupler at which the encoding of the second corresponding RFID inlay is successful;
- determining, by the processor, a position of the second label at which the encoding of the second corresponding RFID inlay on the second label is successful based on the input signal generated by the media sensor;
- generating, by the processor, an angle correlation between the one or more angles of the RFID coupler and the determined position of the second label;
- causing, by the processor, the media to travel by the first travel distance along the media path;
- determining a minimum angle amongst of the one or more angles;
- causing, by the processor, the RFID coupler to rotate to the minimum angle; and
- causing, by the processor, the RFID control system to initiate another encoding attempt to encode the second corresponding RFID inlay.

17. The method of claim 12, further comprising:

determining, by the processor, an angle of the RFID coupler;

causing, by the processor, the RFID control system to initiate encoding attempts to encode the second corresponding RFID inlay at a plurality of power settings;

determining, by the processor for each of the plurality of power settings, whether the encoding of the second corresponding RFID inlay is successful; and generating, by the processor, a power correlation between the angle of the RFID coupler and the plurality of power settings of the RFID coupler based on determining whether the encoding of the second corresponding RFID inlay is successful at each of the plurality of power settings.

18. The method of claim 12, further comprising in response to determining that the first encoding attempt is unsuccessful:
- modifying, by the processor, a power setting of the RFID coupler;
- causing, by the processor, the RFID control system to initiate another encoding attempt to encode the second corresponding RFID inlay until at least the second corresponding RFID inlay is successfully encoded or the RFID control system has attempted to encode the second corresponding RFID inlay at each of one or more power settings;

in response to determining the RFID control system has attempted to encode the second corresponding RFID inlay at each of one or more power settings:
- resetting, by the processor, the power setting of the RFID coupler,
- causing, by the processor, the RFID coupler to rotate by a predetermined angle, and
- causing, by the processor, the RFID control system to initiate another encoding attempt of the second corresponding RFID inlay; and in an instance in which the RFID inlay is successfully encoded:
- determining, by the processor, the power setting of the RFID coupler,
- determining, by the processor, an angle of the RFID coupler,
- determining, by the processor, the position of the second label based on the input signal generated by the media sensor,
- generating, by the processor, an angle correlation between the determined angle of the RFID coupler and the determined position of the second label, and
- generating, by the processor, a power correlation between the determined power setting of the RFID coupler and the determined angle of the RFID coupler.

* * * * *